US012167061B2

(12) United States Patent
Demange et al.

(10) Patent No.: US 12,167,061 B2
(45) Date of Patent: *Dec. 10, 2024

(54) DYNAMIC PRODUCTION OF LINEAR MEDIA CHANNELS FOR MOBILE TRANSPORT CRAFT

(71) Applicant: VIASAT, Inc., Carlsbad, CA (US)

(72) Inventors: Christopher J. Demange, Carlsbad, CA (US); Ronald L Seager, Carlsbad, CA (US)

(73) Assignee: VIASAT, INC., Carlsbad, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/295,131

(22) Filed: Apr. 3, 2023

(65) Prior Publication Data

US 2023/0388568 A1 Nov. 30, 2023

Related U.S. Application Data

(63) Continuation of application No. 17/617,882, filed as application No. PCT/US2019/040398 on Jul. 2, 2019, now Pat. No. 11,641,501.

(51) Int. Cl.
*H04N 21/262* (2011.01)
*H04N 21/214* (2011.01)
(Continued)

(52) U.S. Cl.
CPC ... *H04N 21/26241* (2013.01); *H04N 21/2146* (2013.01); *H04N 21/41422* (2013.01); *H04N 21/6143* (2013.01)

(58) Field of Classification Search
CPC ......... H04N 21/26241; H04N 21/2146; H04N 21/41422; H04N 21/6143
See application file for complete search history.

(56) References Cited

U.S. PATENT DOCUMENTS 6,529,706 B1 * 3/2003 Mitchell ............ H04B 7/18508
709/227
6,810,527 B1 10/2004 Conrad et al.
(Continued)

FOREIGN PATENT DOCUMENTS

KR 101524555 B1 5/2015

*Primary Examiner* — Mulugeta Mengesha
(74) *Attorney, Agent, or Firm* — HOLZER PATEL DRENNAN

(57) ABSTRACT

Techniques are described for dynamic production of linear media channels for delivery to passenger devices disposed on mobile transport craft while the transport craft are in transit. For example, each transport craft has an on-board media system. In accordance with a linear channel schedule, the on-board media system can generate a dynamically produced linear media (DPLM) channel that can be streamed as a continuous media channel to passengers on-board the transport craft. The linear channel schedule defines a sequence of programming time slots, including multiple broadcast programming time slots and multiple pre-positioned programming time slots. Dynamically producing the DPLM channel involves, for each upcoming broadcast programming time slot, obtaining a corresponding broadcast channel for receipt as a stream via an off-board communications network; and for each upcoming pre-positioned programming time slot, obtaining a corresponding pre-positioned content segment for receipt from storage on-board the transport craft.

40 Claims, 5 Drawing Sheets

(51) Int. Cl.
  *H04N 21/414* (2011.01)
  *H04N 21/61* (2011.01)

(56) References Cited

U.S. PATENT DOCUMENTS

| | | | |
|---|---|---|---|
| 8,499,324 | B1 | 7/2013 | Mitchell et al. |
| 8,839,317 | B1 | 9/2014 | Rieger et al. |
| 9,420,314 | B1* | 8/2016 | Dame ................ H04N 21/2146 |
| 2006/0234700 | A1* | 10/2006 | Funderburk ........... H04H 20/62 |
| | | | 455/431 |
| 2010/0146542 | A1 | 6/2010 | Weihs et al. |
| 2014/0192264 | A1 | 7/2014 | Yi et al. |
| 2015/0074732 | A1 | 3/2015 | Green et al. |
| 2015/0245109 | A1* | 8/2015 | Couleaud ......... H04N 21/26291 |
| | | | 725/77 |
| 2016/0080793 | A1 | 3/2016 | Ruffini et al. |
| 2016/0080815 | A1 | 3/2016 | Ruffini et al. |
| 2016/0286242 | A1* | 9/2016 | Easterling ........ H04N 21/41407 |
| 2017/0026720 | A1 | 1/2017 | Nadler |
| 2017/0142496 | A1 | 5/2017 | Malhotra et al. |
| 2017/0353754 | A1 | 12/2017 | Vaclik |
| 2018/0070273 | A1 | 3/2018 | Sleight et al. |

\* cited by examiner

DYNAMIC PRODUCTION OF LINEAR MEDIA CHANNELS FOR MOBILE TRANSPORT CRAFT

RELATED APPLICATION S

This application is a continuation of U.S. patent application Ser. No. 17/617,882 filed on Dec. 9, 2021, entitled "DYNAMIC PRODUCTION OF LINEAR MEDIA CHANNELS FOR MOBILE TRANSPORT CRAFT", which is a U.S. National Stage Application of PCT Number PCT/US2019/040398 filed on Jul. 2, 2019, entitled DYNAMIC PRODUCTION OF LINEAR MEDIA CHANNELS FOR MOBILE TRANSPORT CRAFT, the entirety of each of the foregoing being incorporated herein by reference.

FIELD

The invention relates generally to communications systems for mobile transport craft. More particularly, embodiments relate to dynamic production of linear media channels for in-transport delivery to passenger devices disposed on mobile transport craft.

BACKGROUND

It is becoming increasingly common for users to desire to consume streaming media while in transit (e.g., on mobile devices, like mobile phones, laptop computers, tablet computers, integrated media terminals, or other in-transport terminals), for example while in airplanes, busses, cruise ships, or other transport craft. Such media consumption can be very data-intensive and can place large burdens on resources of communications networks used to deliver communications services to the transport craft. For example, when many passengers desire to consume streaming media on board an aircraft, there may be insufficient network capacity (e.g., via a satellite network link to the aircraft) to provide all the desired media to all those passengers' devices.

In some cases, transport service providers (e.g., airline carriers) and their passengers desire an in-transit media consumption experience that includes, or is comparable to, watching linearly scheduled television channels. For example, traditional television channels (e.g., television channels provided by network and cable television broadcasters and their affiliates) typically show multiple programs at certain times in accordance with a defined linear schedule. Some passengers may prefer such an experience for various reasons, including because such linear programming permits passengers to have a "live" television experience (e.g., where news, sports, a latest episode of a television program, and/or other media content is preferably viewed contemporaneously with the content's initial broadcast), and because such linear programming permits continuous passive viewing by the passenger (e.g., without the passenger having to select a new program after each viewed program ends, as in on-demand types of experiences). Some transport service providers (e.g., and/or media service providers delivering media content to the transport service providers) may prefer such an experience for various reasons, including because such linear programing can permit providers to offer live content (e.g., first-run content, timely content, etc.) to reach a broader audience that includes in-transport passengers; and because such linear programing can provide certain features relating to channel-level branding of content, content rights management, advertisement scheduling and insertion, etc.

While such a linearly scheduled in-transit media consumption experience can be desirable, in-transit streaming of linear content channels can consume a large amount of network resources (e.g., bandwidth). As such, conventional approaches tend either to avoid such in-transit streaming altogether, or to permit passengers to access only a small number of selected linear broadcast channels for in-transit streaming. While such conventional approaches can help minimize impact of in-transit media consumption on network resource usage, such conventional approaches provide limited to no availability of linearly scheduled channels as part of the passenger in-transit media consumption experience.

BRIEF SUMMARY OF THE INVENTION

Embodiments provide techniques for dynamic production of linear media channels for delivery to passenger devices disposed on mobile transport craft while the transport craft are in transit (referred to herein as dynamically produced linear media (DPLM) channels). For example, each transport craft has an on-board media system. In accordance with a linear channel schedule, the on-board media system can dynamically produce a DPLM channel that can be streamed as a continuous media channel to passengers on-board the transport craft. The linear channel schedule defines a sequence of programming time slots, including multiple broadcast programming time slots and multiple pre-positioned programming time slots. Dynamically producing the DPLM channel involves, for each upcoming broadcast programming time slot, obtaining a corresponding broadcast channel for receipt as a stream via an off-board communications network; and for each upcoming pre-positioned programming time slot, obtaining a corresponding pre-positioned content segment for receipt from storage on-board the transport craft.

According to one set of embodiments, an on-board media system is provided for dynamic in-transit production of linear media channels for transport craft in a communications system, the on-board media system disposed on the transport craft. The on-board media system includes: an off-board network interface subsystem to communicate, via an off-board communications network, with an off-board content management system (CMS) to receive a plurality of broadcast channels streamed from the off-board CMS via the off-board communications network; an on-board network interface subsystem disposed on the transport craft to communicate, via an on-board communications network, with a plurality of client devices disposed on the transport craft; an on-board media server disposed on the transport craft and having, stored thereon, a plurality of pre-positioned content segments; and an on-board CMS, in communication with the off-board network interface subsystem, the on-board network interface subsystem, and the on-board media server, to automatically produce a dynamically produced linear media (DPLM) channel for streaming to the plurality of client devices via the on-board network interface subsystem in accordance with a linear channel schedule that defines a sequence of programming time slots including a plurality of broadcast programming time slots and a plurality of pre-positioned programming time slots, the on-board CMS to produce the DPLM channel by: for each of the plurality of broadcast programming time slots, automatically obtaining a corresponding broadcast channel of the plurality of broadcast channels via the off-board network interface subsystem and directing streaming of the corresponding broadcast channel during the broadcast programming time slot; and for each of the plurality of pre-positioned programming time slots, automatically obtaining a corresponding pre-positioned content segment of the plurality of pre-positioned content segments and directing streaming of the corresponding pre-positioned content segment during the pre-positioned programming time slot.

According to another set of embodiments, a method is provided for dynamic in-transit production of linear media channels for transport craft in a communications system. The method includes: determining, automatically by an on-board content management system (CMS) disposed on a transport craft while the transport craft is in transit, whether a next programming time slot of a sequence of programming time slots defined by a linear channel schedule of a dynamically produced linear media (DPLM) is a broadcast programming time slot of a plurality of broadcast programming time slots or is a pre-positioned programming time slot of a plurality of pre-positioned programming time slots; obtaining, by the on-board CMS responsive to determining that the next programming time slot is a broadcast programming time slot, a corresponding broadcast channel as a corresponding content stream for the next programming time slot, the corresponding broadcast channel being one of a plurality of broadcast channels available from an off-board CMS via an off-board communications network; obtaining, by the on-board CMS responsive to determining that the next programming time slot is a pre-positioned programming time slot, a corresponding pre-positioned content segment as the corresponding content stream for the next programming time slot, the corresponding pre-positioned content segment being one of a plurality of pre-positioned content segments stored by an on-board media server disposed on the transport craft; and directing streaming, by the on-board CMS, of the corresponding content stream during the next programming time slot via an on-board communications network to a plurality of client devices disposed on the transport craft.

According to another set of embodiments, a system is provided for dynamic in-transit production of linear media channels for transport craft. The system includes: an off-board content management system (CMS) to communicate a plurality of broadcast channels streamed via an off-board communications network; and a plurality of on-board media systems, each disposed on a transport craft of a plurality of transport craft. Each on-board media system includes: an off-board network interface subsystem to communicate with the off-board CMS via the off-board communications network; an on-board network interface subsystem to communicate with a plurality of client devices disposed on the transport craft; an on-board media server disposed on the transport craft and having, stored thereon, a plurality of pre-positioned content segments; and an on-board CMS to produce a dynamically produced linear media (DPLM) channel for streaming to the plurality of client devices via the on-board network interface subsystem in accordance with a linear channel schedule that defines a sequence of programming time slots including a plurality of broadcast programming time slots and a plurality of pre-positioned programming time slots, the on-board CMS to produce the DPLM channel by: for each of the plurality of broadcast programming time slots, automatically obtaining a corresponding broadcast channel of the plurality of broadcast channels via the off-board network interface subsystem and directing streaming of the corresponding broadcast channel during the broadcast programming time slot; and for each of the plurality of pre-positioned programming time slots, automatically obtaining a corresponding pre-positioned content segment of the plurality of pre-positioned content segments and directing streaming of the corresponding pre-positioned content segment during the pre-positioned programming time slot.

BRIEF DESCRIPTION OF THE DRAWINGS

The accompanying drawings, referred to herein and constituting a part hereof, illustrate embodiments of the disclosure. The drawings together with the description serve to explain the principles of the invention.

In the appended figures, similar components and/or features can have the same reference label. Further, various components of the same type can be distinguished by following the reference label by a second label that distinguishes among the similar components. If only the first reference label is used in the specification, the description is applicable to any one of the similar components having the same first reference label irrespective of the second reference label.

DETAILED DESCRIPTION OF THE INVENTION

In the following description, numerous specific details are provided for a thorough understanding of the present invention. However, it should be appreciated by those of skill in the art that the present invention may be realized without one or more of these details. In other examples, features and techniques known in the art will not be described for purposes of brevity.

Figure 1:
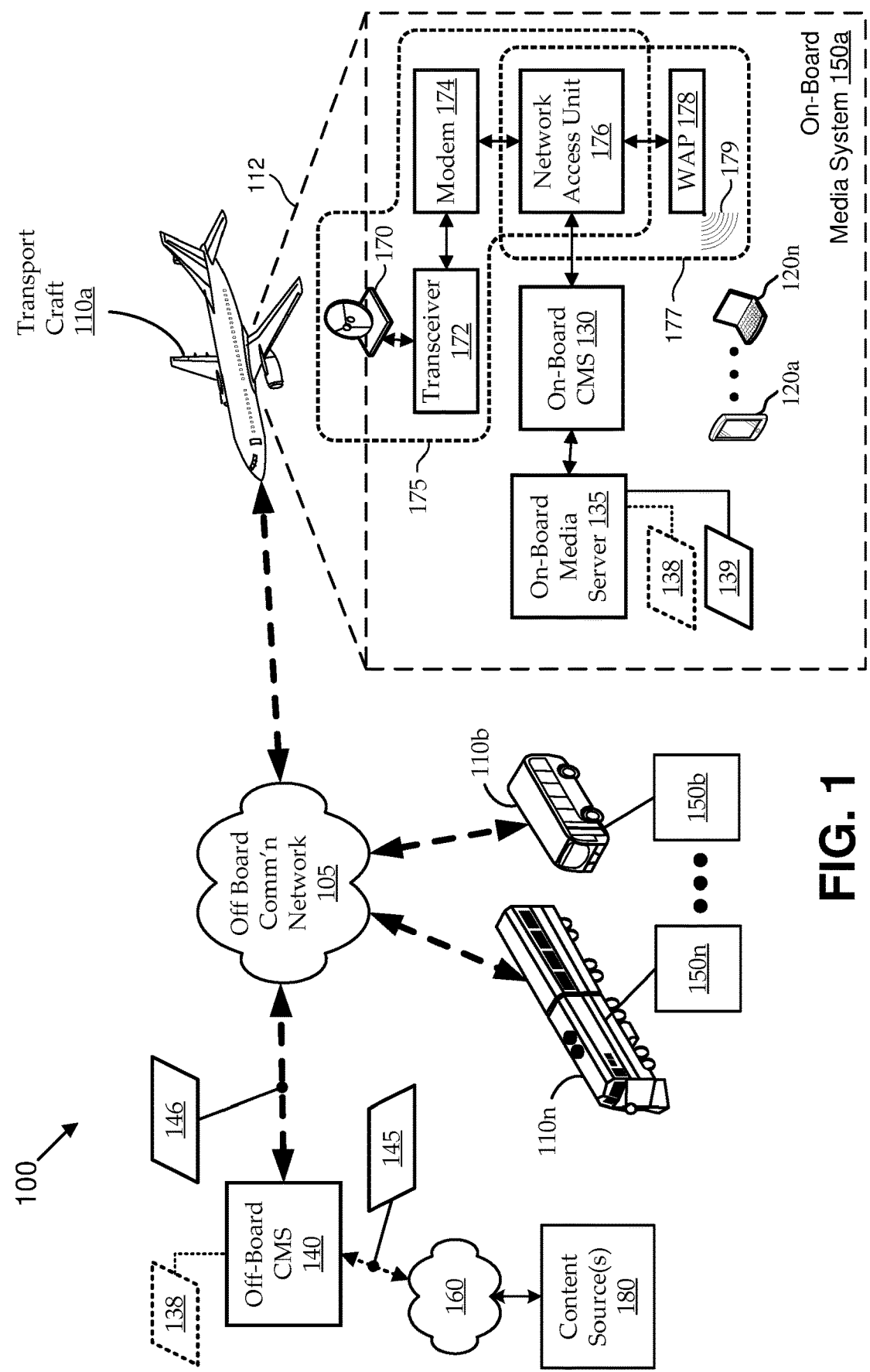
FIG. 1 shows a simplified diagram of a communications system, which provides a context for various embodiments.

FIG. 1 shows a simplified diagram of a communications system 100, which provides a context for various embodiments. As described herein, embodiments operating in such a communications system 100 can facilitate dynamic, in-transit production of linear media channels for delivery to client devices 120 disposed on mobile transport craft 110. The transport craft 110 can include any suitable passenger transport craft, such as airplanes, trains, buses, cruise ships, etc. Client devices 120 can include personal mobile devices, such as smart phones, laptop computers, tablet computers, and the like; devices installed in the transport craft 110, such as seat-back media displays, shared cabin media displays, and the like; and/or any suitable device by which a passenger can consume media while in transit. For example, passengers of transport craft 110 may desire, via their client devices 120, to consume media content in a format similar to that of a traditional television broadcast channel via a client device 120.

Such a traditional television broadcast channel can be referred to as a linearly scheduled channel because such a channel is typically programmed according to a linear schedule, which identifies the sequence of content segments (e.g., television show episodes, movies, advertisements, etc.) to be broadcast on that channel over a period of time. Though such a channel is traditionally broadcast "live" (e.g., in real time according to the predefined linear schedule, as opposed to on-demand, or the like), the various content segments of the channel can include live content (i.e., content being broadcast substantially contemporaneously with the recording of that content, such as with live sporting or political events, etc.), first-run content (e.g., first showings of new television program episodes, pre-recorded events, etc.), re-run content (e.g., second or subsequent showings of television program episodes, showings of movies previously released in other formats, etc.), advertisements, and/or any other suitable content. The term "broadcast channel" is used herein to generally refer to any linearly scheduled media channel not produced dynamically on the transport craft 110, regardless of whether the channel is communicated via a broadcast format and/or protocol. For example, as used herein, a broadcast channel can be communicated (fully or partially) via over-the-air analog or digital broadcast, as an Internet protocol television (IPTV) stream, and/or in any other suitable manner.

Conventionally, receipt of such a broadcast channel by a transport craft 110 while in transit can involve establishing and maintaining a persistent connection with a source of a digital media stream over a communications network, and streaming large amounts of data over a long period of time via the persistent connection. This can be undesirable and even impractical in many cases. For example, streaming large amounts of data over a long period of time can consume an undesirably large amount of bandwidth and other network resources. Also, as transport craft 110 travel, they often tend to move between different regions of connectivity with one or more networks, and those different regions can tend to provide different levels of network availability, signal strength, quality of service, etc. As such, it can be difficult or impossible to maintain a persistent connection with a media stream provider, which can tend to cause interruptions in the receipt of the broadcast channel and a resulting undesirable experience for passengers. For these and other reasons, providers of in-transit media services to passengers (e.g., transportation services providers) typically avoid providing such broadcast channels, or they provide a very small number of such broadcast channels as part of their in-transit media offerings.

Embodiments described herein dynamically produce linear media channels for delivery to passengers' client devices 120 disposed on the mobile transport craft 110 while the transport craft 110 is in transit (referred to herein as dynamically produced linear media (DPLM) channels). Each DPLM channel is a continuous media channel that is selectable for viewing by passengers of the transport craft 110. DPLM channels are each defined by a linear channel schedule 138 as a sequence of programming time slots, such that streaming of content of the DPLM channel is according to the linear channel schedule 138. As a result, a passenger selecting to view a DPLM channel can join a corresponding stream (e.g., via a user interface of a client device 120) and can passively view the content according to the linear channel schedule 138; a passenger currently viewing the linear media channel can continue to view the linear media channel without taking further action (e.g., without having to select next content to view). This is in contrast, for example, to video-on-demand content.

As illustrated, each transport craft 110 can include an on-board media system 150, and the communications system 100 can include an off-board content management system (CMS) 140 in communication with the on-board media systems 150 of the transport craft 110 via one or more off-board communications networks 105. While the on-board media system 150 is streaming content in association with a present programming time slot of for a DPLM channel, components of the on-board media system 150 can obtain appropriate content for streaming during upcoming programming time slots for the DPLM channel, thereby dynamically generating the DPLM channel during transit.

Further, each programming time slot can be a broadcast programming time slot or a pre-positioned programming time slot. As used herein, a "broadcast programming time slot" is a time slot during which content is obtained via any of the off-board communications network 105, and a "pre-positioned programming time slot" is a time slot during which content is obtained via the on-board media server 135. For an upcoming broadcast programming time slot, components of the on-board media system 150 can obtain a corresponding broadcast channel (for receipt over the off-board communications networks 105 from the off-board CMS 140) for streaming during the upcoming broadcast programming time slot; and for an upcoming pre-positioned programming time slot, components of the on-board media system 150 can obtain a corresponding pre-positioned content segment (from storage on-board the transport craft 110) for streaming during the upcoming pre-positioned programming time slot.

The type of time slot associated with each programming time slot can be determined in different ways. In some embodiments, the linear channel schedule 138 explicitly identifies each (of some or all) of the programming time slots as either a broadcast programming time slot or a pre-positioned programming time slot. In some embodiments, the linear channel schedule 138 can include metadata associated with each (of some or all) of the programming time slots, and components of the on-board media system 150 can identify whether each programming time slot is a broadcast programming time slot or a pre-positioned programming time slot based on metadata. For example, metadata can indicate a content title that corresponds to a live program, or a content type that is typically presented live (e.g., sports, news, etc.), in which cases the programming time slot can be determined to be a broadcast programming time slot. As another example, the metadata may indicate a content segment title that is determine to be stored on-board the transport craft 110 (or is labeled in the metadata as stored on-board the transport craft 110), in which case the programming time slot can be determined to be a pre-positioned programming time slot. In some embodiments, each (of some or all) of the programming time slots are associated with a particular content segment; components of the on-board media system 150 can identify whether each particular content segment is stored (or will be stored) on-board the transport craft 110; and the programming time slot can be determined to be a pre-positioned programming time slot when the content segment is (or will be) stored on-board the aircraft, and to be a broadcast programming time slot otherwise.

Dynamically producing the DPLM channels from combinations of broadcast channels and pre-positioned content segments can provide various features. One feature is that the DPLM channels can be provided to passengers on board the transit craft 110 using appreciably less bandwidth and/or other resources of the off-board communications network(s) 105. Another feature is that a continuous linear consumption experience can be provided to passengers without relying on maintaining a persistent connection with a content stream provider over off-board communications network(s) 105.

In general, each DPLM channel can provide an experience similar to that of traditional television channel viewing. Different DPLM channels can be produced to have different levels of correspondence with broadcast channels (e.g., linear media channels otherwise available from broadcast television networks, cable television networks, satellite television networks, etc.). In some embodiments, a DPLM channel is scheduled to faithfully reproduce a corresponding broadcast channel, such that the linear channel schedule 138 of the DPLM channel is the same (or substantially the same) as that of the corresponding broadcast channel. For example, a passenger viewing the DPLM channel will consume the same content segments in the same order as if the passenger were viewing the corresponding broadcast channel at home. In other embodiments, a DPLM channel is scheduled to be different from (e.g., slightly different from, completely different from, etc.) all broadcast channels. In one such embodiment, the DPLM channel is scheduled to include content from two or more broadcast channels. In another such embodiment, broadcast programming time slots of a DPLM channel match corresponding time slots of a corresponding broadcast channel, while pre-positioned programming times slots of the DPLM channel provide content not matching corresponding time slots of the corresponding broadcast channel.

The off-board communications network(s) 105 can include any suitable communications links, such as satellite communications systems, air-to-ground communication systems, hybrid satellite and air-to-ground communications systems, cellular communications systems, etc. Typically, the off-board communications networks 105 include at least one long-range wireless communications link for enabling wireless communications with the transport craft 110 while the transport craft 110 are in transit. Each component in communication with the off-board communications network(s) 105 includes suitable hardware for enabling such communications. In some implementations, the off-board communications network 105 includes a satellite communications system; and the off-board CMS 140 and each on-board media system 150 includes a satellite antenna and other satellite hardware and software components to enable satellite communications. In other implementations, the off-board communications network 105 includes a cellular communications system; and the off-board CMS 140 and each on-board media system 150 includes a cellular antenna and other cellular hardware and software components to enable cellular communications.

Embodiments of the on-board media system 150 include an off-board network interface subsystem 175, an on-board network interface subsystem 177, an on-board media server 135, and an on-board CMS 130. Embodiments of the off-board network interface subsystem 175 can facilitate communications, via the off-board communications network 105, with the off-board CMS 140. The off-board CMS 140 can effectively establish communications with the transport craft 110 (e.g., and/or the transport craft 110 can establish communications with the off-board CMS 140) via the off-board network interface subsystem 175. Such communications can be used for various purposes described herein, such as to stream broadcast channels 146, provide linear channels schedules 138 (e.g., updates to linear channels schedules 138), provide instructions to components of the on-board media system 150, etc. Embodiments of the off-board network interface subsystem 175 can be part of a two-way communication system 112 disposed on the transport craft 110 and can include various components to facilitate bidirectional communication with the off-board communications network 105. In the illustrated embodiment, the off-board network interface subsystem 175 includes an antenna system 170, transceiver 172, modem 174, and network access unit 176. For example, where the off-board communications network 105 includes a satellite communications network, the off-board network interface subsystem 175 can provide for reception of a forward downlink signal from a satellite and transmission of a return uplink signal to the satellite to support two-way data communications between components on the transport craft 110 and components remote from the transport craft 110 (e.g., between the on-board CMS 130 and the off-board CMS 140). In such contexts, the modem 174 can generate modulated uplink data (e.g., a transmit intermediate frequency (IF) signal) for delivery to the transceiver 172, and the transceiver 172 can upconvert and amplify the modulated uplink data to generate the return uplink signal for transmission to the satellite via the antenna system 170. Similarly, the transceiver 172 can receive the forward downlink signal from the satellite via the antenna system 170, and the transceiver 172 can amplify and downconvert the forward downlink signal to generate modulated downlink data (e.g., a receive IF signal) for demodulation by the modem 174. The demodulated downlink data from the modem 174 can be provided to the network access unit 176 for routing to the on-board CMS 130 and/or directly to client devices 120.

Embodiments of the on-board network interface subsystem 177 are disposed on the transport craft 110 and can communicate, via an on-board communications network 179, with client devices 120 disposed on the transport craft 110. The on-board network interface subsystem 177 can also be part of the two-way communication system 112 disposed on the transport craft 110 and can include various components to facilitate bidirectional communication with the client devices 120 disposed on the transport craft 110 via an on-board communications network 179. In the illustrated embodiment, the on-board network interface subsystem 177 also includes the network access unit 176. For example, the network access unit 176 enables the on-board CMS 130 to communicate with both the on-board network interface subsystem 177 and the off-board network interface subsystem 175, and also enables direct communications in some implementations between the on-board network interface subsystem 177 and the off-board network interface subsystem 175 (e.g., the network access unit 176 includes features of both the on-board network interface subsystem 177 and the off-board network interface subsystem 175). The on-board network interface subsystem 177 can also include any other suitable components to form the on-board communications network 179 to facilitate communicative coupling of the client devices 120 with the network access unit 176. For example, while the on-board communications network 179 is illustrated generally as a wireless link, the on-board communications network 179 can include any suitable number and type of physical and/or logical ports, wired and/or wireless links, routers, switches, and/or other components. In some embodiments, the on-board network interface subsystem 177 includes a wireless access point (WAP) 178 that can establish two-way wireless communications with client devices 120 through a wireless local area network (WLAN), or the like. One or more WAPs 178 can be distributed about the transport craft 110, and can, in conjunction with network access unit 176, provide traffic switching and routing functionality; for example, as part of a WLAN extended service set (ESS), etc. The various components of the two-way communication system 112 can be implemented in any suitable manner. For example, while shown as separate components, some or all components can be integrated into a single component (e.g., modem 174 can be integrated with network access unit 176), or segmented into additional components.

Embodiments of the on-board media server 135 are disposed on the transport craft and can have, stored thereon, a number (e.g., hundreds, thousands, etc.) of pre-positioned content segments 139. The on-board media server 135 can include any suitable type or types of data storage, such as one or more hard disk drives, solid state drives, removable storage media, etc. The pre-positioned content segments 139 are stored on the on-board media server 135 separate from (e.g., prior to) use in dynamically generating the DPLM channel. In some implementations, some or all of the pre-positioned content segments 139 are stored to the on-board media server 135 when the transport craft 110 is not in transit, for example, while the transport craft 110 is parked, docked, etc. In other implementations, some or all of the pre-positioned content segments 139 are pushed to the on-board media server 135 opportunistically. For example, opportunistic multicasting, trickle-casting, or other techniques can be used to exploit detected availability of excess capacity on the off-board communications network 105 while the transport craft 110 is in transit. The pre-positioned content segments 139 can include any suitable content segments, such as television program episodes, movies, movie previews, transit information, advertisements, etc. In some implementations, some or all of the pre-positioned content segments 139 that are used as part of the dynamic generation of DPLM channels described herein can also be accessed on-demand by some or all passengers of the transport craft 110 using their client devices 120. In some embodiments, some or all of the pre-positioned content segments 139 are stored in association with a corresponding set of (one or more) content parameters. The content parameters can be stored as metadata, or otherwise stored in association with the pre-positioned content segments 139 (e.g., using a relational database structure). Each corresponding set of content parameters can include any suitable information describing its associated pre-positioned content segment(s) 139, such as content types (e.g., television program episode, movie, advertisement, etc.), genres (e.g., comedy, drama, documentary, reality, family, etc.), content descriptors (e.g., title, keywords, run length, director, rating, etc.), content format (e.g., resolution, file type, device compatibility, etc.), content associations (e.g., distributor, network or other affiliation, related pre-positioned content segments 139, etc.), rights information (e.g., rights holder, distribution requirements or limitations, encryption information, etc.), etc.

Embodiments of the on-board CMS 130 can be in communication with some or all of the off-board network interface subsystem 175, the on-board network interface subsystem 177, and the on-board media server 135. The on-board CMS 130 can automatically produce one or more DPLM channels for streaming to the client devices 120 via the on-board network interface subsystem 177 in accordance with one or more linear channel schedules 138. Each linear channel schedule 138 can define a sequence of programming time slots, including multiple broadcast programming time slots, and multiple pre-positioned programming time slots. The linear channel schedule 138 can be formatted and stored in any suitable manner. In some implementations, the linear channel schedule 138 is stored by the on-board media server 135. In other implementations, the linear channel schedule 138 is stored by (e.g., and/or generated by, maintained by, etc.) the off-board CMS 140.

Figure 2:
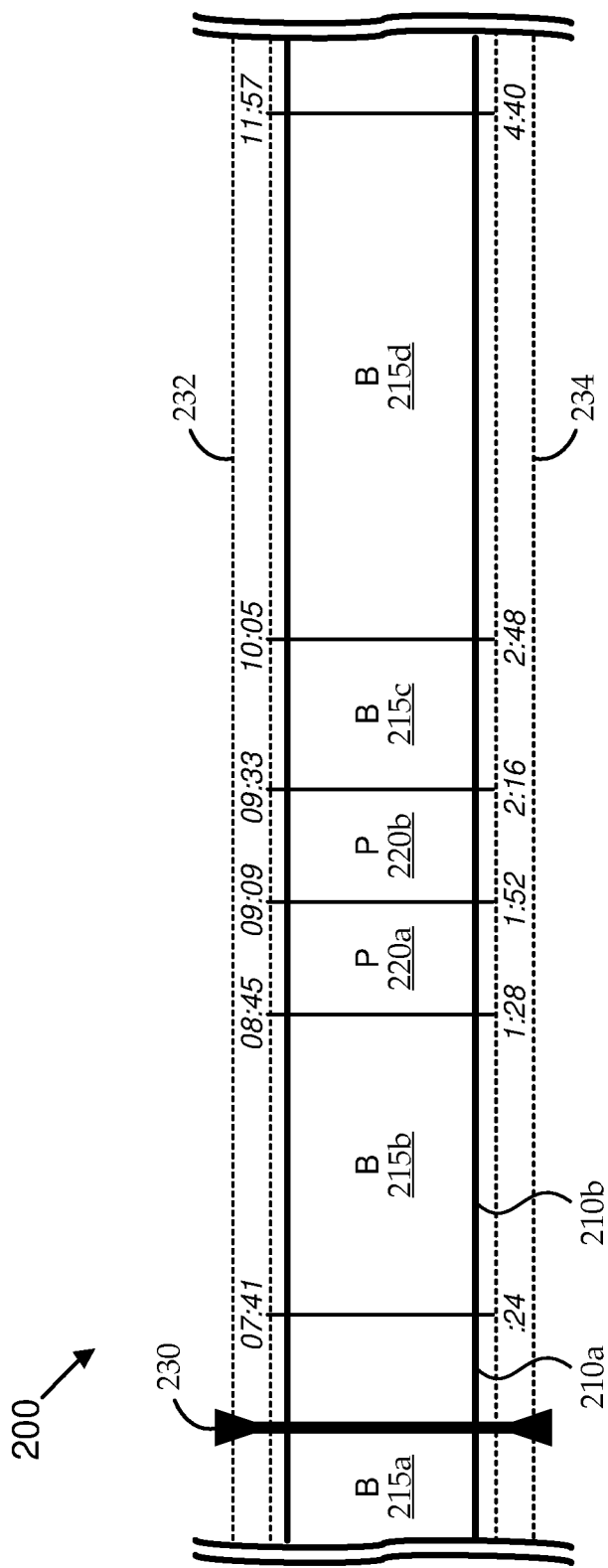
FIG. 2 shows an example graphical representation of a portion of a linear channel schedule.

For the sake of illustration, FIG. 2 shows an example graphical representation 200 of a portion of a linear channel schedule. The graphical representation 200 represents an illustrative portion of an illustrative one of the linear channel schedules 138 of FIG. 1. As illustrated, the linear channel schedule 138 defines a sequence of programming time slots 210, including multiple broadcast programming time slots 215 (represented as "B"), and multiple pre-positioned programming time slots 220 (represented as "P"). During transit, the linear channel schedule 138 helps direct production and streaming of one or more DPLM channels. For example, at a particular present time 230, the content being streamed on the DPLM channel accords with a present programming time slot 210*a* (broadcast programming time slot 215*a* in the graphical representation 200), and the next content to be streamed on the DPLM channel will accord with a next programming time slot 210*b* in the sequence of programming time slots 210 (broadcast programming time slot 215*b* in the graphical representation 200).

The linear channel schedule 138 can include additional information associated with defining the programming time slots 210. In some embodiments, the linear channel schedule 138 defines, or is defined in relation to, one or more time references. In some implementations, a fixed time reference 232 is used. In one such implementation, the fixed time reference 232 is fixed to a transport-related time. For example, the fixed time reference 232 begins substantially at an actual or scheduled departure time of the transport craft 110, substantially at an actual or scheduled time at which in-transit media services become available to passengers of the transport craft 110, or substantially when the transport craft 110 enters a particular transit region (e.g., a coverage area of a satellite spot beam, a geographic boundary associated with certain content rights, etc.). In another such implementation, the fixed time reference 232 is fixed to an external time reference, such as to a standardized time in a departure, destination, or other time zone (e.g., Greenwich mean time). For example, the end of the present programming time slot 210*a* is shown on the fixed time reference 232 as "07:41," which may represent that it is presently 7:41 in the morning in the departure time zone, that seven hours and 41 minutes have elapsed since departure of the transport craft 110, etc. In other implementations, a dynamic time reference 234 is used. In one such implementation, the dynamic time reference 234 indicates how far in the future a particular point in the linear channel schedule 138 is relative to the present time 230. For example, as illustrated, the end of the present programming time slot 210*a* is shown on the relative time reference 234 as ":24," which may represent that the present programming time slot 210*a* will end 24 minutes from now. While the various time references are shown in hours and minutes, the time references can be measured using any suitable temporal measurement. For example, the time references can be measured in seconds, milliseconds, predetermine segment chunk lengths (e.g., by dividing all content segments into chunks of a deterministic runtime), etc.

Returning to FIG. 1, the on-board CMS 130 can automatically produce DPLM channels in accordance with the linear channel schedules 138. For each broadcast programming time slot 215, the on-board CMS 130 can automatically obtain a corresponding broadcast channel 146 for streaming during the broadcast programming time slot 215; and for each pre-positioned programming time slot 220, the on-board CMS 130 can automatically obtain a corresponding pre-positioned content segment for streaming during the pre-positioned programming time slot 220. Each corresponding broadcast channel 146 can be obtained from the off-board CMS 140 over the off-board communications network 105. In some embodiments, the off-board CMS 140 includes one or more sources of broadcast channel content. For example, the off-board CMS 140 is directly affiliated with one or more content broadcasters, content aggregators, etc. (e.g., the off-board CMS 140 is implemented as part of a cable provider headend, or the like). In other embodiments, the off-board CMS 140 is coupled with one or more content sources 180 (e.g., content servers) via one or more content networks 160. The content source(s) 180 can include content broadcasters, content aggregators, and/or any other suitable source of broadcast channel content. In some such implementations, the content source(s) 180 and content network(s) 160 include one or more commercial terrestrial television networks, satellite television providers, over-the air television broadcasters, over-the-top Internet television providers, etc. The off-board CMS 140 can communicate the broadcast channels 146 in any suitable manner. In some implementations, each broadcast channel 146 is communicated over the off-board communications network 105 as a corresponding Internet protocol television (IPTV) stream. In other implementations, each broadcast channel 146 is communicated over the off-board communications network 105 as a unicast communication, as a multicast communication, over an established logical communication link (e.g., a tunnel), or in any other suitable manner.

As used herein, a "broadcast channel 146" is a channel communicated by the off-board CMS 140 to the on-board CMS 130 via the off-board communications network 105 (and the off-board network interface subsystem 175). In some implementations, when a particular broadcast channel 146 is being communicated from the off-board CMS 140 to one or more transport craft 110, the broadcast channel 146 directly corresponds to a television channel that is contemporaneously being broadcast over conventional broadcast television networks (e.g., a cable network, satellite television network, etc.). In other implementations, one or more of the broadcast channels 146 is generated by aggregating broadcast channel content 145, such that the availability, order, and/or other features of some or all broadcast channels 146 differ from television channels that are broadcast over conventional broadcast television networks. In one such implementation, broadcast channel content 145 is selected by a commercial television network to be delivered (e.g., at certain times, in certain orders, with certain restrictions, etc.) to the off-board CMS 140 for use in broadcast channels 146. In another such implementation, broadcast channel content 145 is aggregated from one or more affiliates of a commercial television network. For example, a commercial television sports network may aggregate licensed content relating to sports teams associated with a departure and/or destination region for a transport craft 110; a commercial television network may aggregate licensed television programs and/or movies likely to be of interest to certain passenger audiences of transport craft 110. In some implementations, the off-board CMS 140 receives the broadcast channel content 145 already in a proper format for communication to the transport craft 110; and, during an appropriate broadcast programming time slot 215, the off-board CMS 140 communicates the received broadcast channel content 145 as the broadcast channel 146. In other such implementations, the off-board CMS 140 receives broadcast channel content 145 in a first format; converts the broadcast channel content 145 to a second format that is compatible for use in dynamic generation of the DPLM channel by the on-board CMS 130; during an appropriate broadcast programming time slot 215, communicates the converted content as the broadcast channel 146.

Embodiments of the off-board CMS 140 can operate to communicate broadcast channels 146 over the off-board communications network 105 only when those broadcast channels 146 are being used by one or more on-board CMSs 130 in the generation of DPLM channels. Halting communication of a broadcast channel 146 when the broadcast channel 146 is not being used by any on-board CMSs 130 can free up the resources e.g., bandwidth) of the off-board communications network 105 that would otherwise be used to continue communicating (e.g., streaming) the broadcast channel 146. In some embodiments, the off-board CMS 140 directs communication of the broadcast channels 146 over the off-board communications network 105, and halting of those communications at appropriate times (e.g., during pre-positioned programming time slots 220, and during broadcast programming time slots 215 for which a particular broadcast channel 146 is not the corresponding broadcast channel 146). For example, in implementations where the off-board CMS 140 generates and/or maintains (or is otherwise informed of) the linear channel schedule 138, the off-board CMS 140 can make its own determination as to when and whether to communicate (e.g., and generate) one or more broadcast channels 146 over the off-board communications network 105. In other embodiments, the on-board CMSs 130 direct communication of the broadcast channels 146 over the off-board communications network 105 by instructing the off-board CMS 140 to commence and halt those communications at appropriate times. For example, in implementations where the on-board CMS 130 generates and/or maintains the linear channel schedule 138, the on-board CMS 130 can generate instructions (e.g., requests to commence transmission of broadcast channels 146, requests to halt transmission of broadcast channels 146, etc.), and can communicate those instructions to the off-board CMS 140 over the off-board communications network 105.

Some embodiments can include various features for handling transitions to upcoming broadcast programming time slots 215, in accordance with the linear channel schedule 138. To illustrate certain of these features, referring to the graphical representation 200 of the linear channel schedule 138 in FIG. 2, suppose a particular broadcast channel 146 is being streamed during the present programming time slot 210*a*. In a first illustrative case, it is determined (e.g., by the on-board CMS 130 and/or the off-board CMS 140), according to the linear channel schedule 138, that the particular broadcast channel 146 is scheduled also for streaming in the next programming time slot 210*b* (as illustrated, both the present programming time slot 210*a* and the next programming time slot 210*b* are broadcast programming time slots 215). In one implementation, no instructing or other action is taken with respect to the upcoming end of the present programming time slot 210*a*, and the particular broadcast channel 146 is allowed to continue being communicated by the off-board CMS 140 and received by the on-board CMS 130 over the off-board communications network 105. In another implementation, the on-board CMS 130 and/or the off-board CMS 140 communicates instructions directing continued communication of the particular broadcast channel 146 into the next programming time slot 210*b*.

In a second illustrative case, it is determined (e.g., by the on-board CMS 130 and/or the off-board CMS 140), according to the linear channel schedule 138, that the particular broadcast channel 146 is not scheduled for streaming in the next programming time slot 210b; a different broadcast channel 146 is scheduled for streaming during the next programming time slot 210b. In one implementation of such a case, the on-board CMS 130 can communicate instructions to the off-board CMS 140 associated with the end of the present programming time slot 210a (or with the beginning of the next programming time slot 210b) to request halting communication of the particular broadcast channel 146 and commencing communication of the different broadcast channel 146. In another implementation of such a case, the off-board CMS 140 can be aware of the linear channel schedule 138 and can autonomously halt communication of the particular broadcast channel 146 and commence communication of the different broadcast channel 146 in association with the end of the present programming time slot 210a (or with the beginning of the next programming time slot 210b).

Some embodiments include various features in anticipation of an upcoming broadcast programming time slot 215 during which a next broadcast channel 146 will be streamed, regardless of whether the present programming time slot 210a is a broadcast programming time slot 215 or a pre-positioned programming time slot 220. Some such embodiments can establish (e.g., begin) streaming of the next broadcast channel 146 via the off-board communications network 105 prior to (in anticipation of) the start of the upcoming broadcast programming time slot 215. For example, establishing the streaming can involve allocating and/or configuring resources (e.g., setting up a multicast channel, establishing a virtual tunnel or other logical link associated with the stream, allocating bandwidth, etc.). Some implementations begin buffering portions of the next broadcast channel 146 as is it received prior to the next programming time slot. Such buffering can provide various features. One feature is that, substantially immediately upon beginning the upcoming broadcast programming time slot 215, the buffered content can begin to be streamed to the client devices 120 tuned to the DPLM channel, thereby creating a seamless linear viewing experience. For example, such buffering can maintain the appearance of a seamless experience even if there is an interruption in the receipt of the next broadcast channel 146 around the beginning of the upcoming broadcast programming time slot 215. Another feature is that such buffering can permit time-shifting, where desired. For example, the next broadcast channel 146 can correspond to a channel contemporaneously being broadcast over conventional broadcast television networks; and a start of a next broadcast segment (e.g., the start of a next television episode, movie, advertisement, etc.) may not align in time with the start of the upcoming broadcast programming time slot 215. In such a case, embodiments can use the buffered content to effectively time-shift what is streamed as the DPLM channel, so as to temporally align the start of the next broadcast content segment with the start of the upcoming broadcast programming time slot 215. In an alternative implementation, the off-board CMS 140 can perform such time shifting as part of generating the broadcast channel 146, such that content segments of the broadcast channel 146 are already temporally aligned to programming time slot 210 boundaries when they are received by the on-board CMS 130.

In some instances, a same broadcast channel 146 is scheduled to be streamed during multiple non-adjacent broadcast programming time slots 215, such that communication of the same broadcast channel 146 can be halted and subsequent commenced. For example, referring again to FIG. 2, suppose a same broadcast channel 146 is scheduled to be streamed during broadcast programming time slot 215b and also during broadcast programming time slot 215c. As illustrated, the end of broadcast programming time slot 215b is separated from the beginning of broadcast programming time slot 215c by two pre-positioned programming time slots 220a, 220b having a combined duration of 48 minutes. Assuming that communication of the broadcast channel 146 halts precisely at the end of broadcast programming time slot 215b and commences precisely at the beginning of broadcast programming time slot 215c, 48 minutes will have passed between the halting and subsequent commencing. In some implementations, communication of the broadcast channel 146 can subsequently commence as if no time has passed. For example, the broadcast channel 146 is communicated as a stream being generated and transmitted by the off-board CMS 140, and halting the communication causes the off-board CMS 140 to pause generation and/or transmission of the stream. In other implementations, communication of the broadcast channel 146 can subsequently commence as if the duration (48 minutes) has passed. For example, the broadcast channel 146 is communicated as a stream being generated and transmitted by the off-board CMS 140; when communication is halted, the off-board CMS 140 can continue to generate the stream, but halt transmission of the stream. One use for such an implementation is in cases where the broadcast channel 146 corresponds to a television channel contemporaneously being broadcast over a conventional broadcast television network, or the like, such that the broadcast of the television channel continues even though communication of the broadcast channel 146 has halted. Another use for such an implementation is in cases where the broadcast channel 146 continues to be communicated to other transport craft 110 and/or over other carriers or other communication links of the off-board communications network 105, etc.; even though communication of the broadcast channel 146 to a particular transport craft 110 and/or over a particular carrier or communication link of the off-board communications network 105, etc. has halted.

For each pre-positioned programming time slot 220, the on-board CMS 130 can obtain one or more corresponding pre-positioned content segments 139 from the on-board media server 135 for streaming during the pre-positioned programming time slot 220. In some embodiments, the linear channel schedule 138 identifies the corresponding pre-positioned content segment 139 to be streamed during each pre-positioned programming time slot 220 (for one, multiple, or all of the pre-positioned programming time slots 220). For example, in association with each pre-positioned programming time slot 220, the linear channel schedule 138 includes a memory location, file name, title, or any other suitable identifier by which the on-board CMS 130 can directly locate the corresponding pre-positioned content segment 139 in the on-board media server 135. In other embodiments, the linear channel schedule 138 identifies a corresponding set of content parameters for each pre-positioned programming time slot 220 (for one, multiple, or all of the pre-positioned programming time slots 220). In some such embodiments, the on-board CMS 130 can automatically produce the DPLM channel further by identifying the corresponding pre-positioned content segment 139 as one of the stored pre-positioned content segments 139 that satisfies the corresponding set of content parameters.

For example, as described above, the pre-positioned content segments 139 can be stored by the on-board media server 135 in association with corresponding sets of content parameters. In one embodiment, the linear channel schedule 138 indicates that, during a particular pre-positioned programming time slot 220, the on-board CMS 130 is to select the corresponding pre-positioned content segment 139 as having an identified content type, or one of a permitted subset of content types. For example, the corresponding pre-positioned content segment 139 must be a television program episode (e.g., and not a movie, advertisement, trailer, etc.). In another embodiment, the linear channel schedule 138 indicates that, during a particular pre-positioned programming time slot 220, the on-board CMS 130 is to select the corresponding pre-positioned content segment 139 as having an identified genre, or one of a permitted subset of genres. For example, the corresponding pre-positioned content segment 139 can be any pre-positioned content segment 139 identified as a sports comedy (e.g., and not a drama, documentary, reality, family, etc.). In another embodiment, the linear channel schedule 138 indicates that, during a particular pre-positioned programming time slot 220, the on-board CMS 130 is to select the corresponding pre-positioned content segment 139 as having an identified rating, or one of a permitted subset of ratings. For example, the corresponding pre-positioned content segment 139 can be any pre-positioned content segment 139 identified as rated for children (e.g., having a "Parental Guidance" or "General Audiences" rating only). In another embodiment, the linear channel schedule 138 indicates that, during a particular pre-positioned programming time slot 220, the on-board CMS 130 is to select the corresponding pre-positioned content segment 139 as having an identified set of content associations. For example, the corresponding pre-positioned content segment 139 can be any pre-positioned content segment 139 identified as originating from a particular distributor (e.g., a particular commercial television network and its affiliates). In other embodiments, the linear channel schedule 138 can provide indications using any suitable content parameter, combination of content parameters, content parameter range, weighting and/or grouping of different content parameters, etc. For example, the linear channel schedule 138 can indicate that the corresponding pre-positioned content segment 139 can be any pre-positioned content segment 139 identified as a high-definition-format, drama movie about travel, and having a runtime of between 110 and 120 minutes.

In other embodiments, the linear channel schedule 138 identifies the corresponding pre-positioned content segment 139 to be streamed during each pre-positioned programming time slot 220 (for one, multiple, or all of the pre-positioned programming time slots 220) in other ways. In some such embodiments, the linear channel schedule 138 identifies particular content classes for each pre-positioned programming time slot 220 that effectively restricts which corresponding pre-positioned content segments 139 can be selected for that pre-positioned programming time slot 220. For example, during a pre-positioned programming time slot 220 identified with a first class, only a particular title identified by the linear channel schedule 138 can be selected for streaming; during a pre-positioned programming time slot 220 identified with a second class, only those pre-positioned content segments 139 associated with a particular group or tier of content can be selected (e.g., only content from a particular commercial television network distributor, only premium content, only content previously broadcast during a "prime time" broadcast time slot, etc.); during a pre-positioned programming time slot 220 identified with a third class, any pre-positioned content segments 139 having an appropriate runtime can be selected; etc. In other such embodiments, the linear channel schedule 138 can limit which corresponding pre-positioned content segments 139 can be selected for particular pre-positioned programming time slot 220 in accordance with transit geography (e.g., departure region, destination region, region traveling through at the time of the pre-positioned programming time slot 220, home region associated with the transport craft provider, etc.). For example, certain of the pre-positioned content segments 139 are likely to be popular among passenger associated with a particular geography (e.g., sports content about a sports team from that region, a movie set in that region, travel documentaries or programs about the region, content in a local language of the region, etc.), and/or certain of the pre-positioned content segments 139 may be associated with different rights in different regions (e.g., the transport craft provider may only have rights to stream certain content to its passengers while within certain geographic boundaries), etc. In other such embodiments, the linear channel schedule 138 can limit which corresponding pre-positioned content segments 139 can be selected for particular pre-positioned programming time slot 220 in accordance with passenger characteristics. In one implementation, the linear channel schedule 138 used to dynamically generate a DPLM channel for premium passengers (e.g., a first class cabin of an aircraft, a premium suite on a cruise ship, etc.) can identify a large number of pre-positioned programming time slots 220 as for streaming premium pre-positioned content segments 139; while the linear channel schedule 138 used to dynamically generate a DPLM channel for standard passengers can identify few, or no, pre-positioned programming time slots 220 as for streaming premium pre-positioned content segments 139. In other such embodiments, the linear channel schedule 138 can limit which corresponding pre-positioned content segments 139 can be selected for particular pre-positioned programming time slot 220 in accordance with characteristics of content streamed in one or more recently preceding programming time slots 210 (regardless of whether the preceding programming time slot 210 is a broadcast programming time slot 215 or a pre-positioned programming time slot 220). For example, it can be desirable to cause selection, for streaming during an upcoming pre-positioned programming time slot 220, of a pre-positioned content segment 139 that is very similar to immediately preceding content (e.g., to create an experience of a DPLM channel having a consistent theme), or very dissimilar to immediately preceding content (e.g., to create an experience of a DPLM channel having diverse content).

The above embodiments and examples represent only some of the many ways that the linear channel schedule 138 can be used to implicitly identify acceptable sets (e.g., categories, types, etc.) of pre-positioned content segments 139, without explicitly identifying a particular pre-positioned content segment 139 for a particular pre-positioned programming time slot 220. Such implicit identification still ultimately results in the on-board CMS 130 and/or the off-board CMS 140 selecting a corresponding pre-positioned content segment 139 for streaming during each of some or all pre-positioned programming time slots 220. By including implicit selection as part of the linear channel schedule 138, a same linear channel schedule 138 can be used to generate multiple different DPLM channels. For example, on-board CMSs 130 on different transport craft 110 can use the same linear channel schedule 138 to ultimately generate different DPLM channels because they are traveling along different transit paths, at different times, and/or through different regions; because they have different pre-positioned content segments 139 stored at their respective on-board media servers 135; because they are carrying different compositions of passengers; etc.

Figure 3A:
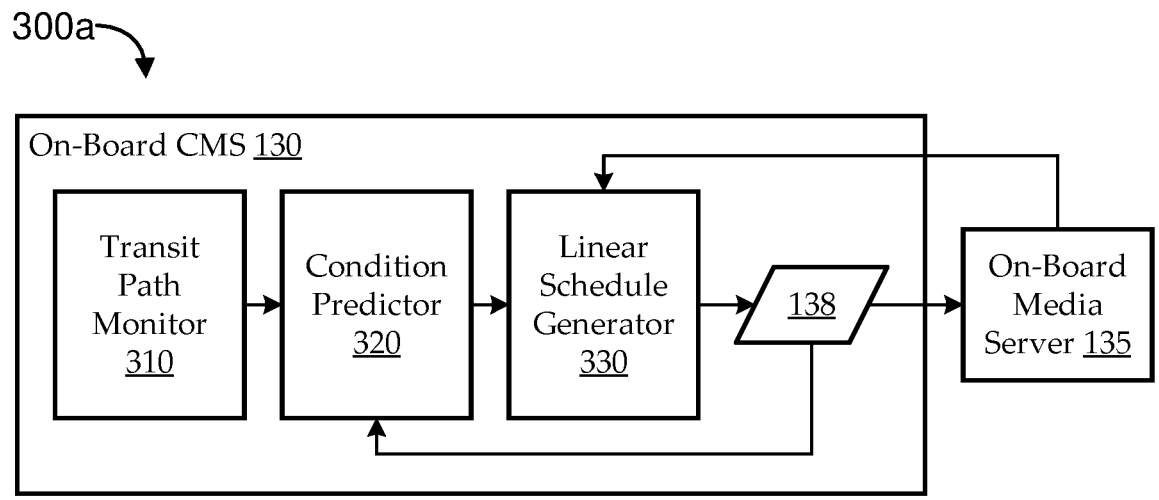
FIGS. 3A and 3B show partial communication systems that include an illustrative on-board content management system (CMS) and off-board CMS, respectively, for dynamic generation of linear channel schedules, according to various embodiments.
Figure 3B:
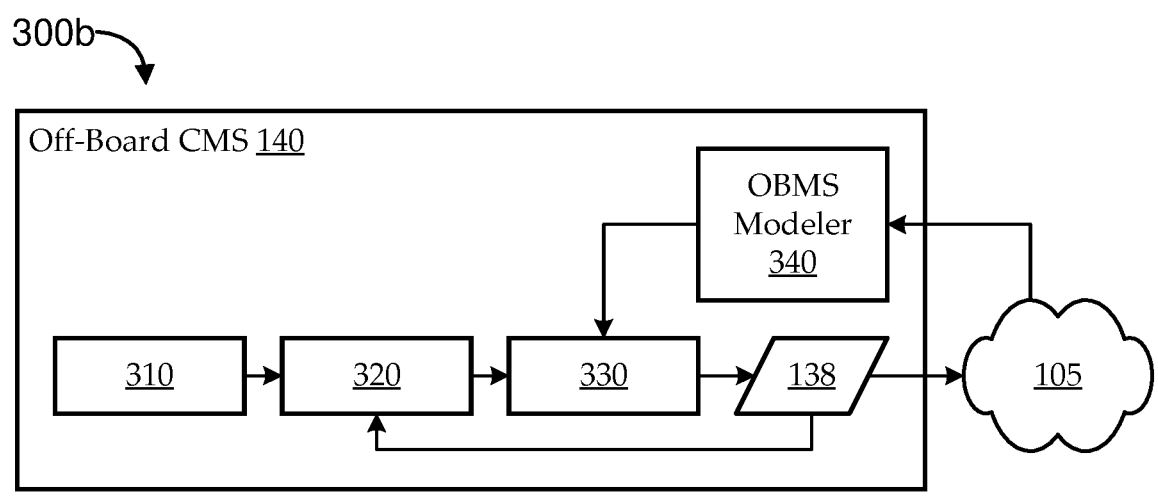

In other embodiments, additionally or alternatively, generation of some or all of the linear channel schedule 138 can be dynamic. FIGS. 3A and 3B show partial communication systems 300 that include an illustrative on-board CMS 130 and off-board CMS 140, respectively, for dynamic generation of linear channel schedules 138, according to various embodiments. Turning first to FIG. 3A, an illustrative partial communication system 300a is shown as having an on-board CMS 130 in communication with an on-board media server 135. The partial communication system 300a can be an implementation of a portion of the communications system 100 of FIG. 1, such as a partial implementation of the on-board media system 150. As illustrated, the on-board CMS 130 includes a linear schedule generator 330 to dynamically generate (e.g., generated, correct, update, etc.) one or more linear channel schedules 138, and to communicate the linear channel schedule(s) 138 to the on-board media server 135. Some embodiments of the on-board CMS 130 further include a transit path monitor 310 and/or a condition predictor 320.

Embodiments of the transit path monitor 310 can monitor the transit path taken by the transport craft 110 on which it is disposed. In some implementations, the transit path monitor 310 has a transit path pre-stored thereon based on a scheduled transit path. For example, a flight plan for a particular airline flight can be stored as a transit path. In such implementations, the transit path monitor 310 can determine past, present, and/or future locations of the transport craft 110 based on the stored transit path. In other implementations, additionally or alternatively, the transit path monitor 310 can dynamically monitor the transit path using one or more sensors (e.g., global positioning satellite (GPS) sensors, altimeters, accelerometers, radio triangulation, etc.). For example, some implementations can have a general pre-stored transit path (e.g., indicating a departure point, a destination point, and/or one or more waypoints, routes segments, etc. along the way), and dynamic monitoring can be used dynamically to verify, correct, modify, and/or otherwise update the transit path over the course of transit. Such implementations can record past locations of the transport craft 110 on the monitored transit path, compute a present location of the transport craft 110 on the transit path, compute (e.g., estimate) predicted future locations of the transport craft 110 at various future times on the transit path, etc.

In embodiments that include the transit path monitor 310, embodiments of the condition predictor 320 can predict likelihood, timing, and/or other parameters associated with certain transit-path-related conditions. In some cases, transport craft 110 experience various conditions in transit that are likely (e.g., or certain) to cause connectivity issues (e.g., poor signal quality, complete loss of connectivity, etc.) between components of the on-board media systems 150 and the off-board communications network 105. For example, terrestrial transport craft 110 (e.g., buses, trains, etc.) can go through tunnels, valleys, and/or other regions that can impact such connectivity; and airborne transport craft 110 (e.g., airplanes) can fly over poles, at certain altitudes, through weather, and/or otherwise through conditions that can impact such connectivity. In other cases, transport craft 110 experience various conditions in transit that can cause content rights-related issues. For example, transport craft 110 may cross various types of geo-boundaries (e.g., national terrestrial or airspace borders), distribution borders (e.g., regions over which certain content is licensed to be distributed by certain parties), etc.

In such cases, embodiments of the condition predictor 320 can receive transit path information from the transit path monitor 310 (e.g., scheduled and/or estimated location information) from which the condition predictor 320 can determine if and when such conditions are likely to occur. For example, the condition predictor 320 can have, stored thereon, mapping and/or other information from which to predict impacts of traveling through certain regions on connectivity, and/or from which to determine the location of rights-related boundaries. In response to predicting such conditions, the condition predictor 320 can communicate information relating to the conditions (e.g., predicted timing, duration, etc.) to the linear schedule generator 330. In response, embodiments of the linear schedule generator 330 can generate the linear channel schedule 138 to address (e.g., avoid) the predicted conditions. In some implementations, the detected condition relates to connectivity interruptions, and the linear schedule generator 330 can generate the linear channel schedule 138, such that pre-positioned programming time slots 220 are scheduled for at least the duration of the predicted condition. For example, suppose it is now 7:30 in the evening, and the transport craft 110 is predicted to be outside of a coverage area of the off-board communications network 105 between 9:46 and 10:12 (e.g., the transport craft 110 will likely have no connectivity for around 26 minutes, beginning in a little over two hours), the linear schedule generator 330 may generate the linear channel schedule 138 to have pre-positioned programming time slots 220 scheduled between 9:30 and (e.g., in about two hours from now). In other implementations, the detected condition relates to rights-related boundaries, and the linear schedule generator 330 can generate the linear channel schedule 138, such that certain selections of the pre-positioned content segments 139 are restricted (e.g., and/or permitted) for streaming by the on-board CMS 130 during any pre-positioned programming time slots 220 impacted by the condition.

In other embodiments, the condition predictor 320 can be used to predict content-related conditions, and the linear schedule generator 330 can dynamically generate the linear channel schedule 138 to address those conditions. In some such embodiments, feedback from the on-board media server 135 can be used to determine an actual runtime of a pre-positioned content segment 139 presently being streamed, or scheduled to be streamed in a pre-positioned programming time slot 220. The condition predictor 320 can determine, based on the feedback (e.g., and, in some cases, based on the currently generated linear channel schedule 138), whether the runtime of the pre-positioned content segment 139 is longer or shorter than the scheduled duration of a corresponding pre-positioned programming time slot 220 (e.g., a present or future pre-positioned programming time slot 220). In response to such a condition, the condition predictor 320 can inform in the linear schedule generator 330, and the linear schedule generator 330 can determine an appropriate course of action. In one implementation, the linear schedule generator 330 automatically lengthens or shortens the pre-positioned programming time slot 220 to accommodate the runtime of the pre-positioned content segment 139. In another implementation, when the runtime is shorter than the duration of the pre-positioned programming time slot 220, the linear schedule generator 330 automatically obtains one or more additional pre-positioned content segments 139 to fill the remaining duration. In another implementation, when the runtime is longer than the duration of the pre-positioned programming time slot 220, and a next programming time slot is another pre-positioned programming time slot 220, the linear schedule generator 330 effectively merges the two pre-positioned programming time slots 220 and determines an optimal combination of one or more additional pre-positioned content segments 139 to fill the remaining duration of the present pre-positioned programming time slot 220 and the duration of the upcoming pre-positioned programming time slot 220. In another implementation, when a next programming time slot is a broadcast programming time slot 215, the linear schedule generator 330 determines whether it is possible to accommodate the difference in timing by time-shifting the corresponding broadcast channel 146 scheduled for the upcoming broadcast programming time slot 215. If it is not possible to accommodate the difference in timing by time-shifting, the linear schedule generator 330 can seek alternative options, such as replacing the upcoming broadcast programming time slot 215 with an upcoming pre-positioned programming time slot 220.

In other implementations, the linear schedule generator 330 can dynamically adjust the linear channel schedule 138 to address mismatches between a scheduled end of a broadcast programming time slot 215 and an actual end of a broadcast content segment of a corresponding broadcast channel 146 being streamed during the broadcast programming time slot 215. As used herein, a broadcast content segment can be any contiguous portion of a broadcast channel that begins and ends at defined logical breaks, such as a television program, a movie, a sporting event. In some implementations, a broadcast content segment can be a collection of broadcast segments (e.g., multiple episodes of a television program assembled into a single broadcast content segment, etc.); and in some implementations, a broadcast content segment can be a portion of another broadcast segment (e.g., one or more individual innings of a baseball game, etc.). When a broadcast content segment is being streamed during a broadcast programming time slot 215, the condition predictor 320 (or other suitable component) can detect that the broadcast content segment has ended, or will end, at a time other than a previously scheduled ending time (e.g., a sporting event may end early, go into overtime, etc.), resulting in a time difference between the scheduled end of the broadcast content segment and the actual end of the broadcast content segment. In response to such an occurrence, embodiments of the linear schedule generator 330 can update the linear channel schedule 318 to at least partially account for the time difference. In some implementations, the linear schedule generator 330 shifts the beginning of the next programming time slot 210 (e.g., regardless of whether the next programming time slot 210 is a pre-positioned programming time slot 220 or another broadcast programming time slot 215), so that the next programming time slot 210 begins sooner or later to account for the time difference. In one implementation, if the next programming time slot 210 is a pre-positioned programming time slot 220, the linear schedule generator 330 automatically lengthens or shortens the upcoming pre-positioned programming time slot 220 to accommodate the time difference. If the time difference results in a longer upcoming pre-positioned programming time slot 220, embodiments can automatically obtain one or more additional (or alternative) pre-positioned content segments 139 to fill the duration. If the time difference results in a shorter upcoming pre-positioned programming time slot 220, embodiments can automatically obtain one or more alternative pre-positioned content segments 139 with shorter runtimes, and/or embodiments can crop the scheduled pre-positioned content segments 139 to match the duration (e.g., by trimming a duration of the scheduled pre-positioned content segments 139, by parsing out one or more sub-segments of the scheduled pre-positioned content segments 139, etc.). In some embodiments, the linear schedule generator 330 can trim the duration of the scheduled pre-positioned content segment 139 to begin at a location within the segment such that the segment will end at the previously scheduled time (e.g., if the broadcast segment runs 15 minutes long, the scheduled pre-positioned content segment 139 may start at a location 15 minutes past its actual beginning).

Turning first to FIG. 3B, an illustrative partial communication system 300b is shown as having an off-board CMS 140 in communication with an off-board communications network 105. The partial communication system 300b can be an implementation of a portion of the communications system 100 of FIG. 1. For example, in context of FIG. 1, the off-board CMS 140 is in communication, via the off-board communications network 105, with on-board media systems 150 of one or more transport craft 110. As illustrated, some or all of the same components described as part of the on-board CMS 130 in FIG. 3A can, additionally or alternatively, be implemented as part of the off-board CMS 140. For example, the off-board CMS 140 can include a linear schedule generator 330 to dynamically generate (e.g., generated, correct, update, etc.) one or more linear channel schedules 138, which can be communicated (or instructions corresponding to the linear channel schedules 138 can be communicated) to the on-board media systems 150 of one or more transport craft 110. Some embodiments of the off-board CMS 140 can further include a transit path monitor 310, a condition predictor 320, and/or an on-board media server (OBMS) modeler 340.

Similar to the description with reference to FIG. 3A, embodiments of the transit path monitor 310 can monitor the transit path taken by one or more transport craft 110. In various embodiments, the transit path monitor 310 can have one or more transit paths pre-stored thereon based on a scheduled transit path, and/or can dynamically monitor the transit path of one or more transit craft 110 using received information from the transport craft 110, from one or more sensors, from other entities (e.g., from dispatch locations, etc.), and/or in any other suitable manner. In embodiments that include the transit path monitor 310, embodiments of the condition predictor 320 can predict likelihood, timing, and/or other parameters associated with certain transit-path-related conditions, such as conditions likely to impact connectivity of one or more transport craft 110 with the off-board CMS 140 and/or conditions impacting content rights. In response to predicting such conditions, the condition predictor 320 can communicate information relating to the conditions (e.g., predicted timing, duration, etc.) to the linear schedule generator 330; and the linear schedule generator 330 can generate one or more linear channel schedules 138 to address (e.g., avoid) the predicted conditions.

Similar to FIG. 3A, some embodiments, the condition predictor 320 can be used to predict content-related conditions. Unlike in FIG. 3A, however, some embodiments of the off-board CMS 140 of FIG. 3B are not be configured to receive direct feedback from some or all on-board media servers 135 of some or all transport craft 110. As such, embodiments of the off-board CMS 140 can include the OBMS modeler 340. Embodiments of the OBMS modeler 340 can maintain a model of the contents of some or all on-board media servers 135 of some or all transport craft 110. In some implementations, the OBMS modeler 340 includes a dictionary of identifiers (e.g., indexes, titles, etc.), along with any related content parameters (e.g., runtime, genre, content type, rating, etc.) that can result in prediction of a content-related condition and/or to otherwise impact dynamic generation of the linear channel schedule 138. In other implementations, the OBMS modeler 340 includes a copy of some or all of the pre-positioned content segments 139 that have been stored to some or all of the on-board media servers 135, along with a manifest or other suitable record of which on-board media servers 135 have each particular pre-positioned content segment 139 stored thereon. The models maintained by the OBMS modeler 340 can be used to enable similar functionality to that described with reference to FIG. 3A as enabled by feedback from the on-board media server 135.

While FIGS. 3A and 3B show components implemented in either the on-board CMS 130 or the off-board CMS 140, respectively, other embodiments can implemented some or all components across the off-board CMS 140 and one or more on-board CMSs 130. In one such embodiment, a first subset of on-board CMSs 130 are implemented with on-board capability to dynamically generate linear channel schedules 138, while a second subset are not; such that the first subset is implemented as shown in FIG. 3A, while the second subset does not include the illustrated components and relies instead on those components being implemented in the off-board CMS 140 (as shown in FIG. 3B). In another such embodiment, each on-board CMS 130 includes an instance of the transit path monitor 310, and the condition predictor 320 and linear schedule generator 330 are implemented in the off-board CMS 140.

Figure 4:
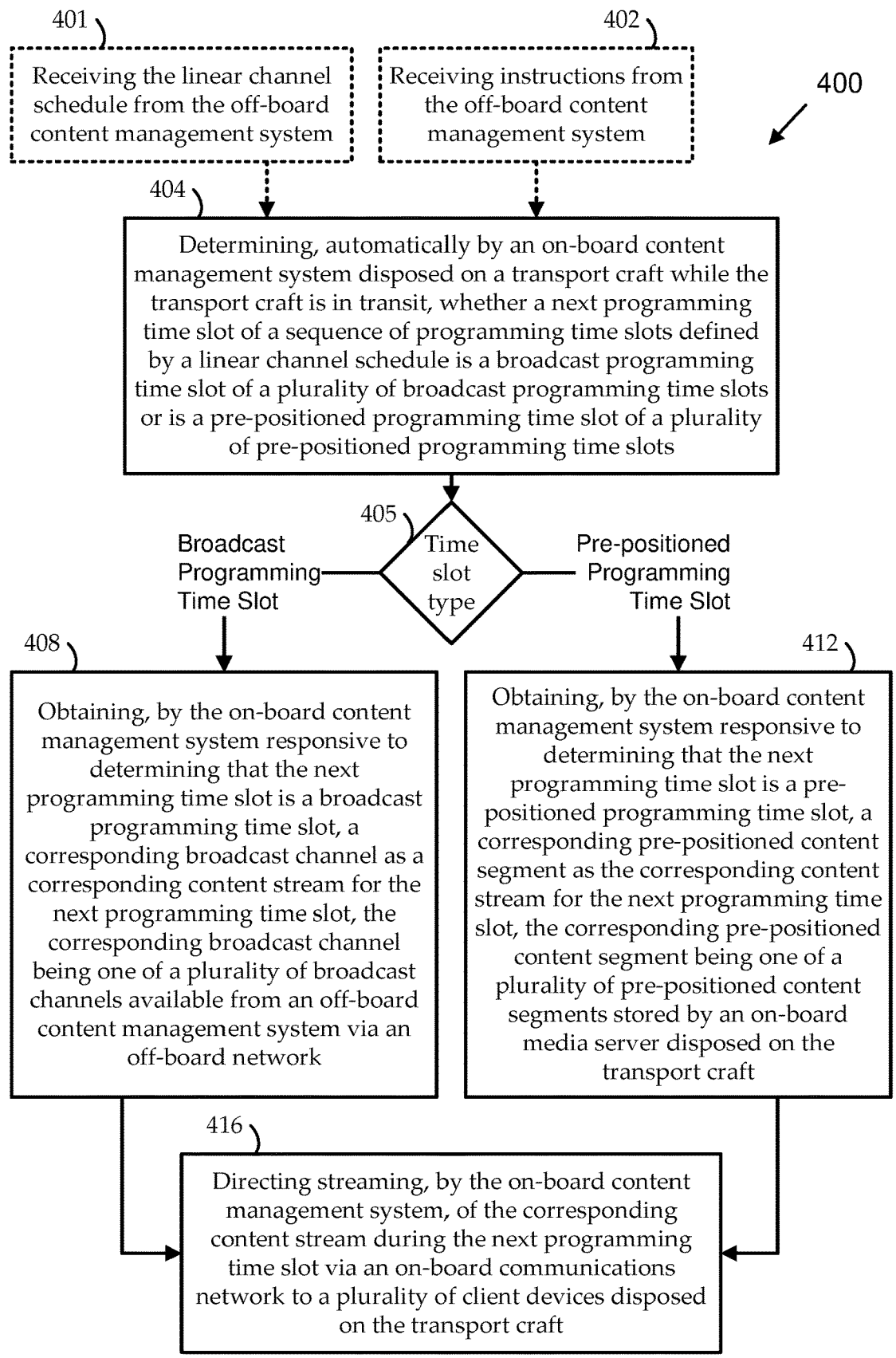
FIG. 4 shows a flow diagram of an illustrative method for dynamic in-transit production of linear media channels for transport craft in a communications system, according to various embodiments.

FIG. 4 shows a flow diagram of an illustrative method 400 for dynamic in-transit production of DPLM channels for transport craft in a communications system, according to various embodiments. Some embodiments of the method 400 begin at stage 404 by determining whether a next programming time slot of a sequence of programming time slots defined by a linear channel schedule is a broadcast programming time slot (i.e., one of multiple broadcast programming time slots in the sequence), or is a pre-positioned programming time slot (i.e., one of multiple pre-positioned programming time slots in the sequence. The determination at stage 404 can be made automatically by an on-board content management system (CMS) disposed on a transport craft while the transport craft is in transit.

A decision block, shown as stage 405, represents the result of the determination at stage 404 as either a broadcast programming time slot or a pre-positioned programming time slot. In the event that it is determined at stage 404 that the next programming time slot is a broadcast programming time slot, the method 400 can proceed to stage 408. At stage 408, embodiments can obtain (e.g., by the on-board CMS) a corresponding broadcast channel as a corresponding content stream for the next programming time slot. The corresponding broadcast channel is one of multiple broadcast channels available from an off-board CMS via an off-board communications network. For example, at least some of the multiple broadcast channels are available from the off-board CMS (e.g., can be streamed from the off-board CMS to the on-board CMS) as Internet protocol television (IPTV) streams. As described herein, obtaining the corresponding broadcast channel can involve various additional steps. In some embodiments, obtaining the corresponding broadcast channel can involve establishing communication of (e.g., requesting and beginning to receive a stream of) the corresponding broadcast channel prior to the next programming time slot, for example, to facilitate pre-allocation and/or pre-configuration of related network resources. In some such embodiments, as the corresponding broadcast channel is received, portions can be pre-buffered, for example, to help ensure a continued linear media consumption experience, even when there are brief losses of connection between the on-board CMS and the off-board CMS; and/or to facilitate time-shifting of a start of a content segment of the corresponding broadcast channel to temporally align with a start of the next programming time slot.

In the event that it is determined at stage 404 that the next programming time slot is a pre-positioned programming time slot, the method 400 can proceed to stage 412. At stage 412, embodiments can obtain (e.g., by the on-board CMS) a corresponding pre-positioned content segment as the corresponding content stream for the next programming time slot. The corresponding pre-positioned content segment is one of multiple pre-positioned content segments stored by an on-board media server disposed on the transport craft. According to some embodiments, for each of some or all pre-positioned programming time slots, the linear channel schedule can explicitly identify a corresponding pre-positioned content segment for streaming during that pre-positioned programming time slot. According to other embodiments, for each of some or all pre-positioned programming time slots, the linear channel schedule can implicitly identify a corresponding pre-positioned content segment for streaming during that pre-positioned programming time slot (e.g., by identifying sets of content parameters, etc.). In some embodiments, obtaining the corresponding broadcast channel in stage 408 and/or obtaining the corresponding pre-positioned content segment in stage 412 can involve halting communication of a broadcast channel that is presently being received from the off-board CMS (e.g., to conserve bandwidth and/or other network resources).

At stage 416, embodiments can direct streaming (e.g., by the on-board CMS) of the corresponding content stream during the next programming time slot via an on-board communications network to a plurality of client devices disposed on the transport craft. For example, if the corresponding content stream is obtained at stage 408 as the corresponding broadcast channel, the corresponding broadcast channel is communicated (e.g., streamed) from the off-board CMS to the on-board CMS via the off-board communications network, and re-streamed from the on-board CMS to the client devices via the on-board communications network during the next programming time slot. If the corresponding content stream is obtained at stage 412 as the corresponding pre-positioned content segment, the corresponding pre-positioned content segment is obtained by the on-board CMS from the local on-board media server 135, and streamed from the on-board CMS to the client devices via the on-board communications network during the next programming time slot.

In some embodiments, the method 400 begins at stage 401 by receiving the linear channel schedule (e.g., in its entirety, as an update to a previously received linear channel schedule, etc.) from the off-board CMS at the transport craft via the off-board communications network while the transport craft is in transit. In such an embodiment, the method 400 can proceed at stage 404 using the linear channel schedule received in stage 401. In other embodiments, the method 400 begins at stage 402 by receiving instructions (e.g., by the on-board CMS) from the off-board CMS via the off-board communications network. The instructions direct the on-board CMS to produce the DPLM channel in accordance with the linear channel schedule. For example, the linear channel schedule is maintained and/or generated by the off-board CMS, and the off-board CMS directs which corresponding content stream is obtained and streamed by the on-board CMS at each programming time slot. In such an embodiment, the method 400 can proceed at stage 404 using the instructions received in stage 402.

Figure 5:
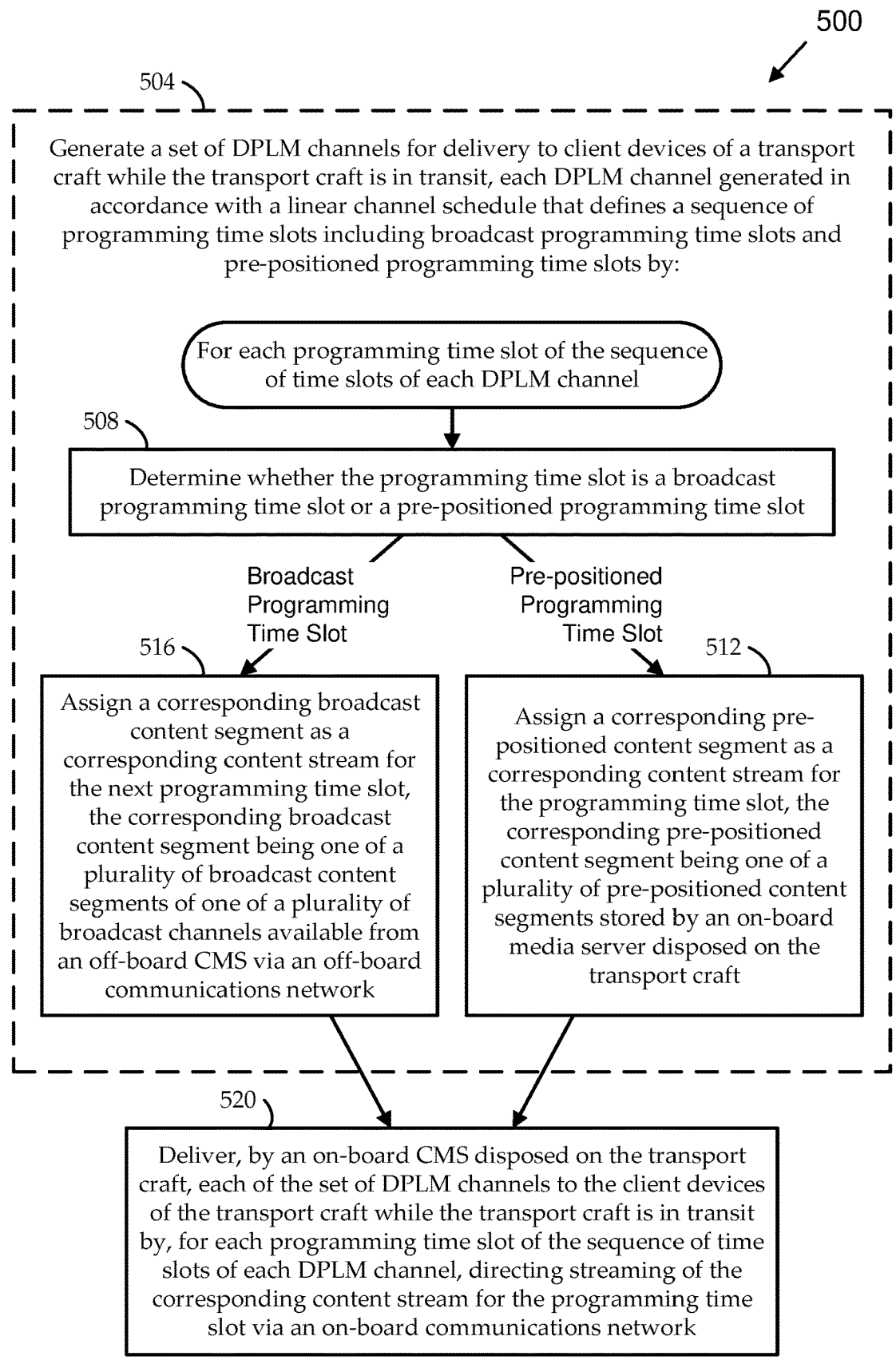
FIG. 5 shows a flow diagram of an illustrative method for dynamic in-transit production of linear media channels for transport craft in a communication system.

FIG. 5 shows another flow diagram for a method 500 for dynamic in-transit production of linear media channels for transport craft in a communications system. Embodiments of the method 500 begin at stage 504 by generating a set of (i.e., one or more) dynamically produced linear media (DPLM) channels for delivery to client devices of a transport craft while the transport craft is in transit. As described herein, each DPLM channel is generated in accordance with a linear channel schedule that defines a sequence of programming time slots including multiple broadcast programming time slots and multiple pre-positioned programming time slots. In various embodiments, each DPLM channel is generated by an on-board CMS of a transit craft, by an off-board CMS in communication with transit craft, and/or by a combination of one or more on-board CMSs and one or more off-board CMSs.

Embodiments of the method 500 proceed be performing stages 508-516 for each programming time slot of the sequence of time slots of each DPLM channel. At stage 508, embodiments can determine whether the programming time slot is a broadcast programming time slot or a pre-positioned programming time slot. At stage 512, responsive to determining that the programming time slot is a pre-positioned programming time slot, embodiments can assign a corresponding pre-positioned content segment as a corresponding content stream for the programming time slot. The corresponding pre-positioned content segment is one of multiple pre-positioned content segments stored by an on-board media server disposed on the transport craft. At stage 516, responsive to determining that the next programming time slot is a broadcast programming time slot, embodiments can assign a corresponding broadcast content segment as a corresponding content stream for the next programming time slot. The corresponding broadcast content segment is one of multiple broadcast content segments of one of multiple broadcast channels available from an off-board CMS via an off-board communications network.

In some embodiments, the off-board CMS has stored, in communication therewith, the linear channel schedule for at least one of the set of DPLM channels; and the determining at stage 508 is performed by the off-board CMS. In some such embodiments, assigning the corresponding pre-positioned content segment at stage 512 includes: identifying, by the off-board CMS, the corresponding pre-positioned content segment as being one of the pre-positioned content segments stored by the on-board media server disposed on the transport craft; and communicating, by the off-board CMS to the on-board CMS, instructions directing the on-board CMS to obtain the corresponding pre-positioned content segment from the on-board media server for streaming during the programming time slot. In other such embodiments, the assigning at stage 512 includes communicating, by the off-board CMS to the on-board CMS, an indication that the programming time slot is a pre-positioned programming time slot. Responsive to the indication, the off-board CMS can identify the corresponding pre-positioned content segment as being one of the plurality of pre-positioned content segments stored by the on-board media server disposed on the transport craft; and the on-board CMS can obtain the corresponding pre-positioned content segment from the on-board media server for streaming during the programming time slot. In some such embodiments, the assigning the corresponding broadcast content segment at stage 516 includes: identifying, by the off-board CMS, the corresponding broadcast content segment as being one of the broadcast content segments of one of the broadcast channels available for streaming from the off-board CMS to the transport craft via the off-board communications network; and communicating, by the off-board CMS to the on-board CMS, instructions directing the on-board CMS to receive the corresponding broadcast content segment via the off-board communications network for streaming during the programming time slot.

In some embodiments, the on-board CMS has stored, in communication therewith, the linear channel schedule for at least one of the set of DPLM channels, and the determining at stage 508 is performed by the on-board CMS. In some such embodiments, the assigning at stage 512 includes: identifying, by the on-board CMS, the corresponding pre-positioned content segment as being one of the pre-positioned content segments stored by the on-board media server disposed on the transport craft; and obtaining, by the on-board CMS, the corresponding pre-positioned content segment from the on-board media server for streaming during the programming time slot. In some such embodiments, the assigning at stage 516 includes: identifying, by the on-board CMS, the corresponding broadcast content segment as being one of the broadcast content segments of one of the broadcast channels available for streaming from the off-board CMS to the transport craft via the off-board communications network; communicating, by the on-board CMS to the off-board CMS, a request to receive the corresponding broadcast content segment from the off-board CMS via the off-board communications network; and receiving, by the on-board CMS from the off-board CMS, responsive to the request, the corresponding broadcast content segment from the off-board CMS via the off-board communications network for streaming during the programming time slot. In other such embodiments, the assigning at stage 516 includes: communicating, by the on-board CMS to the off-board CMS, an indication that the programming time slot is a broadcast programming time slot. Responsive to the indication, embodiments can identify, by the off-board CMS, the corresponding broadcast content segment as being one of the broadcast content segments of one of the broadcast channels available for streaming from the off-board CMS to the transport craft via the off-board communications network; communicate the corresponding broadcast content segment from the off-board CMS to the on-board CMS via the off-board communications network; and receive, by the on-board CMS, the corresponding broadcast content segment from the off-board CMS via the off-board communications network for streaming during the programming time slot.

In some embodiments, the identifying at stage 512 can include identifying (by the on-board CMS and/or the off-board CMS) the corresponding pre-positioned content segment as having segment characteristics compatible with the time slot characteristics of the programming time slot. Additionally or alternatively, the identifying at stage 516 can include identifying (by the on-board CMS and/or the off-board CMS) the corresponding broadcast content segment as having segment characteristics compatible with the time slot characteristics of the programming time slot. Each programming time slot can be defined in the linear channel schedule in accordance with various time slot characteristics, such as time slot duration; and each pre-positioned content segment and/or broadcast content segment can have associated metadata indicating various segment characteristics, such as segment runtime. For example, identifying a particular content segment for a particular programming time slot can include identifying the content segment as having a segment runtime that is compatible with (e.g., fits within) the time slot duration of the particular programming time slot.

At stage 520, embodiments can deliver, by an on-board CMS disposed on the transport craft, each of the set of DPLM channels to the client devices of the transport craft while the transport craft is in transit by, for each programming time slot of the sequence of time slots of each DPLM channel, directing streaming of the corresponding content stream for the programming time slot via an on-board communications network.

It will be understood that, when an element or component is referred to herein as "connected to" or "coupled to" another element or component, it can be connected or coupled to the other element or component, or intervening elements or components may also be present. In contrast, when an element or component is referred to as being "directly connected to," or "directly coupled to" another element or component, there are no intervening elements or components present between them. It will be understood that, although the terms "first," "second," "third," etc. may be used herein to describe various elements, components, these elements, components, regions, should not be limited by these terms. These terms are only used to distinguish one element, component, from another element, component. Thus, a first element, component, discussed below could be termed a second element, component, without departing from the teachings of the present invention. As used herein, the terms "logic low," "low state," "low level," "logic low level," "low," or "0" are used interchangeably. The terms "logic high," "high state," "high level," "logic high level," "high," or "1" are used interchangeably.

As used herein, the terms "a", "an" and "the" may include singular and plural references. It will be further understood that the terms "comprising", "including", having" and variants thereof, when used in this specification, specify the presence of stated features, steps, operations, elements, and/or components, but do not preclude the presence or addition of one or more other features, steps, operations, elements, components, and/or groups thereof. In contrast, the term "consisting of" when used in this specification, specifies the stated features, steps, operations, elements, and/or components, and precludes additional features, steps, operations, elements and/or components. Furthermore, as used herein, the words "and/or" may refer to and encompass any possible combinations of one or more of the associated listed items.

While the present invention is described herein with reference to illustrative embodiments, this description is not intended to be construed in a limiting sense. Rather, the purpose of the illustrative embodiments is to make the spirit of the present invention be better understood by those skilled in the art. In order not to obscure the scope of the invention, many details of well-known processes and manufacturing techniques are omitted. Various modifications of the illustrative embodiments, as well as other embodiments, will be apparent to those of skill in the art upon reference to the description. It is therefore intended that the appended claims encompass any such modifications.

Furthermore lore, some of the features of the preferred embodiments of the present invention could be used to advantage without the corresponding use of other features. As such, the foregoing description should be considered as merely illustrative of the principles of the invention, and not in limitation thereof. Those of skill in the art will appreciate variations of the above-described embodiments that fall within the scope of the invention. As a result, the invention is not limited to the specific embodiments and illustrations discussed above, but by the following claims and their equivalents.

What is claimed is:

1. A system for dynamic in-transit production of linear media channels for transport craft, the system comprising:
    an off-board content management system (CMS) to communicate a plurality of broadcast channels streamed via an off-board communications network; and
    a plurality of on-board media systems, each disposed on a transport craft of a plurality of transport craft, each on-board media system comprising:
        an off-board network interface subsystem to communicate with the off-board CMS via the off-board communications network;
        an on-board network interface subsystem to communicate with a plurality of client devices disposed on the transport craft;
        an on-board media server disposed on the transport craft and having, stored thereon, a plurality of pre-positioned content segments; and
        an on-board CMS to automatically produce a dynamically produced linear media (DPLM) channel for streaming to the plurality of client devices via the on-board network interface subsystem in accordance with a linear channel schedule that defines a sequence of programming time slots including a plurality of broadcast programming time slots and a plurality of pre-positioned programming time slots, the on-board CMS to produce the DPLM channel by:
            for each of the plurality of broadcast programming time slots, automatically obtaining a corresponding broadcast channel of the plurality of broadcast channels via the off-board network interface subsystem and directing streaming of the corresponding broadcast channel during the broadcast programming time slot; and
            for each of the plurality of pre-positioned programming time slots, automatically obtaining a corresponding pre-positioned content segment of the plurality of pre-positioned content segments and directing streaming of the corresponding pre-positioned content segment during the pre-positioned programming time slot; and
            for a present broadcast programming time slot of the plurality of broadcast programming time slots:
                determining whether the corresponding broadcast channel being streamed during the present broadcast programming time slot is scheduled for streaming in a next programming time slot of the sequence of programming time slots according to the linear channel schedule; and
                responsive to determining that the corresponding broadcast channel is not scheduled for streaming in the next programming time slot, directing the off-board CMS to halt streaming of the corresponding broadcast channel via the off-board communications network in accordance with an end of the present broadcast programming time slot.

2. The system of claim 1, wherein the next programming time slot of the sequence of programming time slots is a broadcast programming time slot.

3. The system of claim 1, wherein the next programming time slot of the sequence of programming time slots is a pre-positioned programming time slot.

4. The system of claim 1, wherein:
the off-board CMS is further to store the linear channel schedule, to generate instructions in accordance with the linear channel schedule, and to communicate the instructions to the on-board CMS via the off-board communications network;
the instructions identify the corresponding broadcast channel for streaming during each of at least a portion of the plurality of broadcast programming time slots, and the instructions identify the corresponding pre-positioned content segment for streaming during each of at least a portion of the plurality of pre-positioned programming time slots; and
the on-board CMS is to automatically produce the DPLM channel in accordance with the instructions.

5. The system of claim 1, wherein the on-board CMS is to automatically produce the DPLM channel further by:
for each of the sequence of programming time slots, determining whether a next programming time slot is one of the plurality of broadcast programming time slots;
communicating, responsive to determining that the next programming time slot is one of the plurality of broadcast programming time slots, a request to the off-board CMS via the off-board network interface subsystem for a next broadcast channel of the plurality of broadcast channels to be streamed during the next programming time slot; and
establishing streaming of the next broadcast channel via the off-board communications network, and buffering of the next broadcast channel, in response to the request and prior to the next programming time slot.

6. The system of claim 1, wherein the on-board CMS is to automatically produce the DPLM channel further by, for each of at least one broadcast programming time slot of the plurality of broadcast programming time slots:
pre-buffering a portion of the corresponding broadcast channel, the corresponding broadcast channel having a sequence of broadcast content segments; and
determining a content break in the corresponding broadcast channel indicating a start of a next broadcast content segment of the sequence of broadcast content segments,
wherein the directing the streaming of the corresponding broadcast channel during the broadcast programming time slot comprises time-shifting the streaming of the corresponding broadcast channel to temporally align the start of the next broadcast content segment with a start of the broadcast programming time slot.

7. The system of claim 1, wherein the on-board CMS is to automatically produce the DPLM channel further by:
detecting, while streaming a broadcast content segment during a broadcast programming time slot of the plurality of broadcast programming time slots, a time difference between a scheduled end of the broadcast content segment and an actual end of the broadcast content segment; and
updating the linear channel schedule, responsive to the detecting, to at least partially account for the time difference.

8. The system of claim 7, wherein:
a next programming time slot of the sequence of programming time slots is scheduled, according to the linear channel schedule prior to the updating, to begin at a first time and to end at a second time; and
the updating the linear channel schedule comprises updating scheduling of the next programming time slot to have an updated duration, such that the next programming time slot begins at a third time corresponding to the actual end of the broadcast content segment, and the next programming time slot ends at the second time.

9. The system of claim 8, wherein:
the next programming time slot is a pre-positioned programming time slot; and
the on-board CMS is to automatically produce the DPLM channel by automatically obtaining one or more corresponding pre-positioned content segments to have a runtime corresponding to the updated duration.

10. The system of claim 8, wherein:
the next programming time slot is a pre-positioned programming time slot;
the scheduled end of the broadcast content segment precedes the actual end of the broadcast content segment; and
the on-board CMS is to automatically produce the DPLM channel by selecting a portion of the corresponding pre-positioned content segment for streaming during the pre-positioned programming time slot, such that the portion of the corresponding pre-positioned content segment has a runtime corresponding to the updated duration.

11. The system of claim 1, wherein the on-board CMS is to automatically produce the DPLM channel further by:
for a first broadcast programming time slot of the plurality of broadcast programming time slots, directing the off-board CMS to halt streaming of a first corresponding broadcast channel via the off-board communications network in accordance with an end of the first broadcast programming time slot; and
for a second broadcast programming time slot of the plurality of broadcast programming time slots, directing the off-board CMS to commence streaming of a second corresponding broadcast channel via the off-board communications network in accordance with a beginning of the second broadcast programming time slot,
wherein the second broadcast programming time slot is subsequent to the first broadcast programming time slot in the sequence of programming time slots.

12. The system of claim 11, wherein the second corresponding broadcast channel is a continuation of the first corresponding broadcast channel.

13. The system of claim 11, wherein the second corresponding broadcast channel is the same as, and not a continuation of, the first corresponding broadcast channel.

14. The system of claim 11, wherein the second corresponding broadcast channel is different from the first corresponding broadcast channel.

15. The system of claim 11, wherein the first broadcast programming time slot and the second broadcast programming time slot are separated in the sequence of programming time slots by at least a pre-positioned programming time slot.

16. The system of claim 1, wherein, for each pre-positioned programming time slot of at least some of the plurality of pre-positioned programming time slots, the linear channel schedule identifies the corresponding pre-positioned content segment of the plurality of pre-positioned content segments to be streamed during the pre-positioned programming time slot.

17. The system of claim 1, wherein:
for at least one pre-positioned programming time slot of the plurality of pre-positioned programming time slots, the linear channel schedule identifies a corresponding set of content parameters for the at least one pre-positioned programming time slot; and
the on-board CMS is to automatically produce the DPLM channel further by, for the at least one pre-positioned programming time slot, identifying the corresponding pre-positioned content segment as one of the plurality of pre-positioned content segments satisfying the corresponding set of content parameters.

18. The system of claim 1, wherein the on-board media server further has the linear channel schedule stored thereon.

19. The system of claim 1, wherein:
the off-board CMS is further to communicate the linear channel schedule to the on-board CMS via the off-board communications network.

20. The system of claim 1, wherein the off-board communications network comprises a satellite communications network.

21. The system of claim 1, wherein:
the off-board CMS is coupled with a content network via which to receive a plurality of content streams; and
the off-board CMS is further to generate the plurality of broadcast channels from the plurality of content streams for streaming via the off-board communications network.

22. A method for dynamic in-transit production of linear media channels for transport craft in a communications system, the method comprising:
generating a dynamically produced linear media (DPLM) channel for delivery to client devices of a transport craft via an on-board network interface subsystem while the transport craft is in transit, the DPLM channel being generated in accordance with a linear channel schedule that defines a sequence of programming time slots including a plurality of broadcast programming time slots and a plurality of pre-positioned programming time slots, the DPLM channel being generated, for each programming time slot of the sequence of time slots of the DPLM channel, by:
determining whether the programming time slot is a broadcast programming time slot of the plurality of broadcast programming time slots or is a pre-positioned programming time slot of the plurality of pre-positioned programming time slots;
responsive to determining that the programming time slot is a pre-positioned programming time slot, assigning a corresponding pre-positioned content segment as a corresponding content stream for the programming time slot, the corresponding pre-positioned content segment being one of a plurality of pre-positioned content segments stored by an on-board media server disposed on the transport craft; and
responsive to determining that the programming time slot is a broadcast programming time slot, assigning a corresponding broadcast channel as a corresponding content stream for the programming time slot, the corresponding broadcast channel being one of a plurality of a plurality of broadcast channels available from an off-board content management system (CMS) via an off-board communications network;
delivering, by an on-board CMS disposed on the transport craft, the DPLM channel to the client devices of the transport craft while the transport craft is in transit by,
for each programming time slot of the sequence of time slots of the DPLM channel, directing streaming of the corresponding content stream for the programming time slot via an on-board communications network; and
for a present broadcast programming time slot of the plurality of broadcast programming time slots:
determining whether the corresponding broadcast channel being streamed during the present broadcast programming time slot is scheduled for streaming in a next programming time slot of the sequence of programming time slots according to the linear channel schedule; and
responsive to determining that the corresponding broadcast channel is not scheduled for streaming in the next programming time slot, directing the off-board CMS to halt streaming of the corresponding broadcast channel via the off-board communications network in accordance with an end of the present broadcast programming time slot.

23. The method of claim 22, wherein:
the off-board CMS has stored, in communication therewith, the linear channel schedule for at least one the DPLM channel; and
the determining is performed by the off-board CMS.

24. The method of claim 23, wherein the assigning the corresponding pre-positioned content segment comprises:
identifying, by the off-board CMS, the corresponding pre-positioned content segment as being one of the plurality of pre-positioned content segments stored by the on-board media server disposed on the transport craft; and
communicating, by the off-board CMS to the on-board CMS of the transport craft, instructions directing the on-board CMS to obtain the corresponding pre-positioned content segment from the on-board media server for streaming during the programming time slot.

25. The method of claim 23, wherein the assigning the corresponding pre-positioned content segment comprises:
communicating, by the off-board CMS to the on-board CMS, an indication that the programming time slot is a pre-positioned programming time slot; and
responsive to the indication:
identifying, by the off-board CMS, the corresponding pre-positioned content segment as being one of the plurality of pre-positioned content segments stored by the on-board media server disposed on the transport craft; and
obtaining, by the on-board CMS, the corresponding pre-positioned content segment from the on-board media server for streaming during the programming time slot.

26. The method of claim 23, wherein the assigning the corresponding broadcast content segment comprises:
identifying, by the off-board CMS, the corresponding broadcast content segment as being one of the plurality of broadcast content segments of one of the plurality of broadcast channels available for streaming from the off-board CMS to the transport craft via the off-board communications network; and
communicating, by the off-board CMS to the on-board CMS, instructions directing the on-board CMS to receive the corresponding broadcast content segment via the off-board communications network for streaming during the programming time slot.

27. The method of claim 22, wherein:
the on-board CMS has stored, in communication therewith, the linear channel schedule for at least one the DPLM channel; and
the determining is performed by the on-board CMS.

28. The method of claim 27, wherein the assigning the corresponding pre-positioned content segment comprises:
identifying, by the on-board CMS, the corresponding pre-positioned content segment as being one of the plurality of pre-positioned content segments stored by the on-board media server disposed on the transport craft; and
obtaining, by the on-board CMS, the corresponding pre-positioned content segment from the on-board media server for streaming during the programming time slot.

29. The method of claim 24, wherein the identifying the corresponding pre-positioned content segment further comprises:
identifying the corresponding pre-positioned content segment as having segment characteristics compatible with time slot characteristics of the programming time slot.

30. The method of claim 27, wherein the assigning the corresponding broadcast content segment comprises:
identifying, by the on-board CMS, the corresponding broadcast content segment as being one of the plurality of broadcast content segments of one of the plurality of broadcast channels available for streaming from the off-board CMS to the transport craft via the off-board communications network;
communicating, by the on-board CMS to the off-board CMS, a request to receive the corresponding broadcast content segment from the off-board CMS via the off-board communications network; and
receiving, by the on-board CMS from the off-board CMS, responsive to the request, the corresponding broadcast content segment from the off-board CMS via the off-board communications network for streaming during the programming time slot.

31. The method of claim 27, wherein the assigning the corresponding broadcast content segment comprises:
communicating, by the on-board CMS to the off-board CMS, an indication that the programming time slot is a broadcast programming time slot; and
responsive to the indication:
identifying, by the off-board CMS, the corresponding broadcast content segment as being one of the plurality of broadcast content segments of one of the plurality of broadcast channels available for streaming from the off-board CMS to the transport craft via the off-board communications network;
communicating the corresponding broadcast content segment from the off-board CMS to the on-board CMS via the off-board communications network; and
receiving, by the on-board CMS, the corresponding broadcast content segment from the off-board CMS via the off-board communications network for streaming during the programming time slot.

32. The method of claim 26, wherein the identifying the corresponding broadcast content segment further comprises:
identifying the corresponding broadcast content segment as having segment characteristics compatible with time slot characteristics of the programming time slot.

33. The method of claim 22, wherein the assigning the corresponding broadcast content segment comprises:
receiving broadcast channel content by the off-board CMS from at least one content source via at least one content network; and
generating the one of the plurality of broadcast channels, by the off-board CMS, from the broadcast channel content, such that the one of the plurality of broadcast channels comprises the corresponding broadcast content segment, and such that the one of the plurality of broadcast channels is for streaming via the off-board communications network.

34. The method of claim 33, wherein the one of the plurality of broadcast channels is generated as an Internet protocol television (IPTV) stream.

35. The method of claim 22, further comprising:
communicating, prior to the generating, the linear channel schedule for at least the DPLM channels from the off-board CMS to the on-board CMS.

36. The method of claim 22, wherein the generating further comprises:
determining, for a particular broadcast programming time slot of the sequence of time slots of the DPLM channel, a time difference between a runtime of the corresponding broadcast content segment and a duration of the particular broadcast programming time slot; and
updating the linear channel schedule, responsive to the detecting, to at least partially account for the time difference.

37. The method of claim 22, wherein:
for each of at least one pre-positioned programming time slot of the sequence of time slots of at least the DPLM channel, the linear channel schedule identifies the corresponding pre-positioned content segment to be assigned to the pre-positioned programming time slot.

38. The method of claim 22, wherein:
for each of at least one pre-positioned programming time slot of the sequence of time slots of at least the DPLM channel, the linear channel schedule identifies a corresponding set of content parameters for the pre-positioned programming time slot; and
the assigning the corresponding pre-positioned content segment comprises identifying the corresponding pre-positioned content segment as satisfying the corresponding set of content parameters.

39. The method of claim 22, wherein:
for each of at least one broadcast programming time slot of the sequence of time slots of at least the DPLM channel, the linear channel schedule identifies the corresponding broadcast content segment to be assigned to the broadcast programming time slot.

40. The method of claim 22, wherein:
for each of at least one broadcast programming time slot of the sequence of time slots of at least the DPLM channel, the linear channel schedule identifies a corresponding set of content parameters for the broadcast programming time slot; and
the assigning the corresponding broadcast content segment comprises identifying the corresponding broadcast content segment as satisfying the corresponding set of content parameters.

* * * * *